United States Patent
Kitts et al.

(10) Patent No.: US 10,743,054 B2
(45) Date of Patent: *Aug. 11, 2020

(54) SYSTEMS AND METHODS FOR ADDRESSABLE TARGETING OF ADVERTISING CONTENT

(71) Applicant: ADAP.TV, Inc., Dulles, VA (US)

(72) Inventors: Brendan Kitts, Seattle, WA (US); Dyng Au, Seattle, WA (US); Sih Huseyin Ulger, Sammamish, WA (US)

(73) Assignee: ADAP.TV, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,055

(22) Filed: Aug. 7, 2019

(65) Prior Publication Data

US 2019/0364320 A1 Nov. 28, 2019

Related U.S. Application Data

(63) Continuation of application No. 14/817,896, filed on Aug. 4, 2015, now Pat. No. 10,425,674.

(60) Provisional application No. 62/032,965, filed on Aug. 4, 2014.

(51) Int. Cl.
| | |
|---|---|
| H04N 21/2668 | (2011.01) |
| H04N 21/258 | (2011.01) |
| H04N 21/25 | (2011.01) |
| H04N 21/442 | (2011.01) |
| H04N 21/81 | (2011.01) |

(52) U.S. Cl.
CPC ....... *H04N 21/2668* (2013.01); *H04N 21/252* (2013.01); *H04N 21/25883* (2013.01); *H04N 21/44222* (2013.01); *H04N 21/812* (2013.01)

(58) Field of Classification Search
USPC .......................................... 725/35
See application file for complete search history.

(56) References Cited

U.S. PATENT DOCUMENTS

| | | | | |
|---|---|---|---|---|
| 7,062,510 B1 * | 6/2006 | Eldering | ................ | G06Q 30/02 |
| 7,949,565 B1 * | 5/2011 | Eldering | ................ | G06Q 30/02 |
| | | | | 705/14.49 |
| 2001/0004733 A1 * | 6/2001 | Eldering | ................ | G06Q 20/20 |
| | | | | 705/14.41 |

(Continued)

*Primary Examiner* — Nathan J Flynn
*Assistant Examiner* — Caroline Somera
(74) *Attorney, Agent, or Firm* — Bookoff McAndrews, PLLC

(57) ABSTRACT

A method of targeting of advertising content for a consumer product is disclosed. The method comprises obtaining consumer demographic data from a first server over a network, the consumer demographic data including a plurality of demographic attributes for each person among a plurality of persons; obtaining product purchaser data for a plurality of product purchasers of the consumer product from a second server over the network, each product purchaser among the plurality of product purchasers being among the plurality of persons; and enriching the purchaser data with the consumer demographic data. The method further comprises enriching viewing data with consumer demographic data; and selecting viewed media among the aggregated viewed media having the highest similarity to the product purchasers as target media for the advertising content.

12 Claims, 18 Drawing Sheets

(56) References Cited

U.S. PATENT DOCUMENTS

| | | | |
|---|---|---|---|
| 2001/0049620 A1* | 12/2001 | Blasko | G06Q 10/10 |
| | | | 705/14.53 |
| 2005/0091107 A1* | 4/2005 | Blum | G06Q 30/02 |
| | | | 705/14.65 |
| 2010/0070417 A1* | 3/2010 | Flynn | H04W 12/0609 |
| | | | 705/51 |
| 2011/0288939 A1* | 11/2011 | Elvekrog | G06Q 30/0269 |
| | | | 705/14.67 |
| 2014/0007151 A1 | 1/2014 | Matz et al. | |
| 2014/0100947 A1 | 4/2014 | Kitts et al. | |
| 2014/0101693 A1 | 4/2014 | Shkedi | |
| 2015/0058884 A1 | 2/2015 | Eldering et al. | |
| 2015/0348095 A1* | 12/2015 | Dixon | G06Q 30/0246 |
| | | | 705/14.45 |
| 2016/0165277 A1 | 6/2016 | Kirillov et al. | |

\* cited by examiner

SYSTEMS AND METHODS FOR ADDRESSABLE TARGETING OF ADVERTISING CONTENT

CROSS-REFERENCE TO RELATED APPLICATIONS

This application is a continuation of and claims the benefit of priority to U.S. application Ser. No. 14/817,896, filed Aug. 4, 2015, which claims the benefit of priority to U.S. Provisional Patent Application No. 62/032,965, entitled "Systems and Methods for Addressable Targeting of Advertising Content," filed on Aug. 4, 2014, the entireties of which are incorporated herein by reference.

This application also makes reference to U.S. Nonprovisional application Ser. No. 13/209,346, entitled "Automatically Targeting Ads to Television Using Demographic Similarity," filed Aug. 12, 2011, which is incorporated herein by reference in its entirety.

TECHNICAL FIELD

The present disclosure relates to systems and methods for evaluating television media instances for advertisement spots based on various factors for reaching television viewers who are desired product buyers.

BACKGROUND

Television is very different from online advertising. In online advertising, it is possible to deliver ads to individual persons. In television, advertisements have traditionally been embedded in a single high definition video stream and broadcast using over-the-air terrestrial transmission towers, satellite, and cable.

However those traditional limitations with television are beginning to disappear. Due to new and better set top boxes, several cable operators and satellite providers have begun to allow advertisers to direct their ads to individuals. In the television advertising industry, this is referred to as "addressable targeting," and refers to delivering an ad to a specific household, which then sits on the set top box and triggers based on specific conditions.

Current systems supporting some addressable capabilities include Dish and DirecTV using the Invidi Set Top Box. Cablevision is capable of addressable advertising on 3.5 million Motorola, Cisco and Pace set top boxes in the New York market; and Comcast has announced addressable capabilities that work on Video On Demand using BlackArrow and their X1 Set Top Box.

Although addressable capabilities are beginning to emerge, this has been a very slow process, and the industry has a long history of hyping the technology and then finding little adoption. Several problems are holding addressable television advertising back. First, there is a lack of targeting algorithms that will work on television infrastructure. Namely, it is one thing to have the hardware to target ads to individuals, but the advertiser still needs to know to whom to deliver their ads. The targeting algorithm needs to be able to be able to work with the relatively low subscriber counts that many cable operators handle (the TV industry is quite diverse, so there are cable operators who have only a few million subscribers. A direct match between these subscribers and an advertiser's database will result in very few matches). Another problem is that a market design is needed so that television addressable inventory can be bought and sold in an efficient manner. Finally, there is a desire for a way for the advertiser to estimate the value from targeting addressable inventory. From the seller's point of view, there needs to be a way to rationally set prices.

The present disclosure is directed to overcoming one or more of these above-referenced challenges.

SUMMARY OF THE DISCLOSURE

According to certain embodiments, a method is disclosed for targeting of advertising content for a consumer product, the method comprising: obtaining, from a first server over a network, product purchaser data for a plurality of product purchasers of the consumer product; obtaining, from a second server over the network, cable subscriber data for a plurality of cable subscribers; calculating by a hardware processor a first similarity between one or more product purchasers among the plurality of product purchasers and one or more cable subscribers among the plurality of cable subscribers; and selecting cable subscribers among the plurality of cable subscribers having the highest first similarity to the product purchasers as target cable subscribers for the advertising content.

According to certain embodiments, a system is disclosed for targeting of advertising content for a consumer product, the system comprising: a first server providing product purchaser data for a plurality of product purchasers of the consumer product over a network; a second server providing cable subscriber data for a plurality of cable subscribers over the network; an advertising targeting controller configured to: obtain the product purchaser data and the cable subscriber data; calculate by a hardware processor a first similarity between one or more product purchasers among the plurality of product purchasers and one or more cable subscribers among the plurality of cable subscribers; and select cable subscribers among the plurality of cable subscribers having the highest first similarity to the product purchasers as target cable subscribers for the advertising content.

According to certain embodiments, a non-transitory computer readable medium storing a program causing a computer to execute a method of targeting of advertising content for a consumer product is disclosed, the executed method comprising: obtaining, from a first server over a network, product purchaser data for a plurality of product purchasers of the consumer product; obtaining, from a second server over the network, cable subscriber data for a plurality of cable subscribers; calculating by a hardware processor a first similarity between one or more product purchasers among the plurality of product purchasers and one or more cable subscribers among the plurality of cable subscribers; and selecting cable subscribers among the plurality of cable subscribers having the highest first similarity to the product purchasers as target cable subscribers for the advertising content.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF THE DRAWINGS

Figure 1:
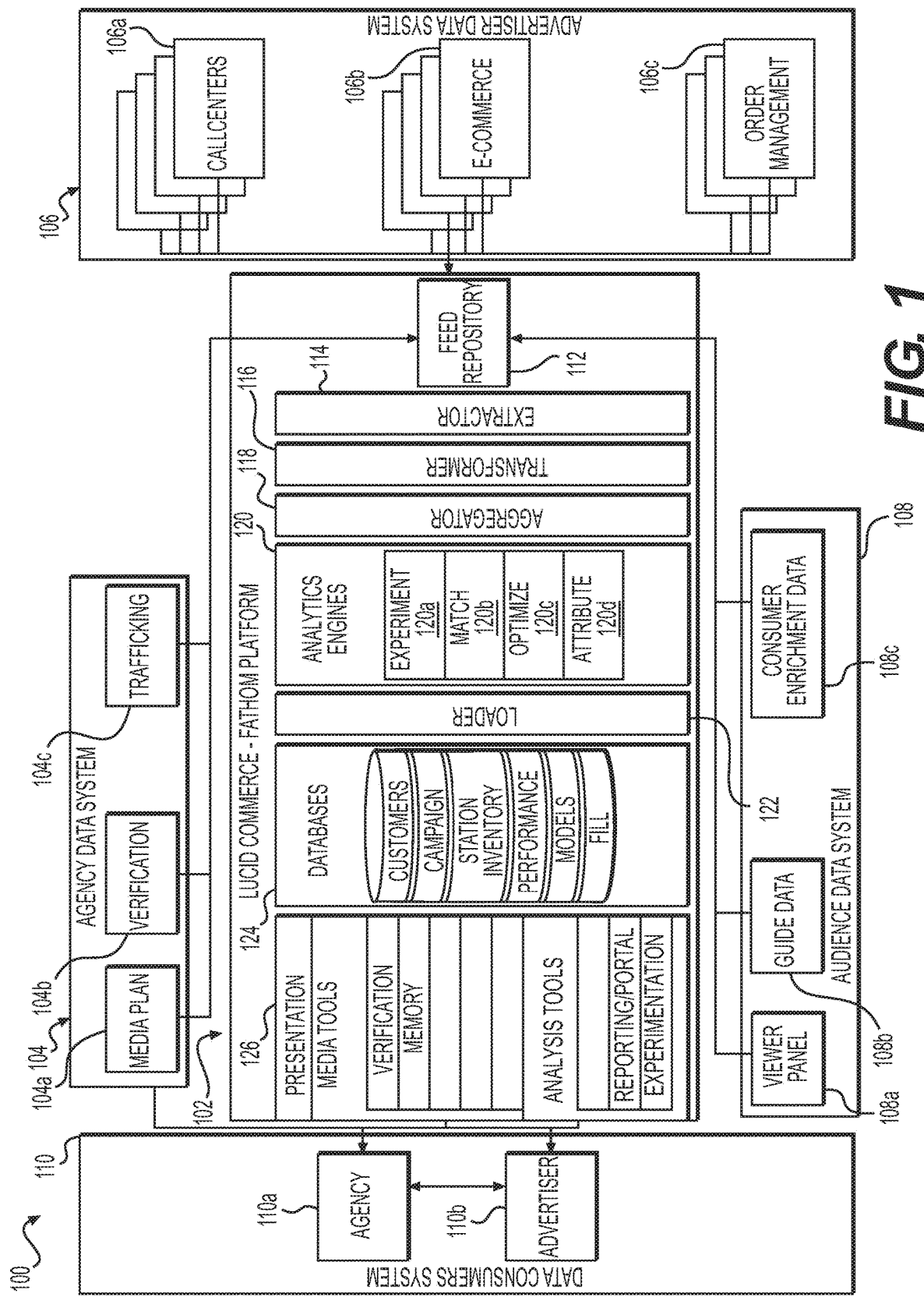
FIG. 1 depicts an exemplary analytics environment and an exemplary system infrastructure for modeling and detailed targeting of television media, according to exemplary embodiments of the present disclosure.

FIG. 1 depicts an exemplary analytics environment and an exemplary system infrastructure for modeling and detailed targeting of television media, according to exemplary embodiments of the present disclosure.

Figure 2:
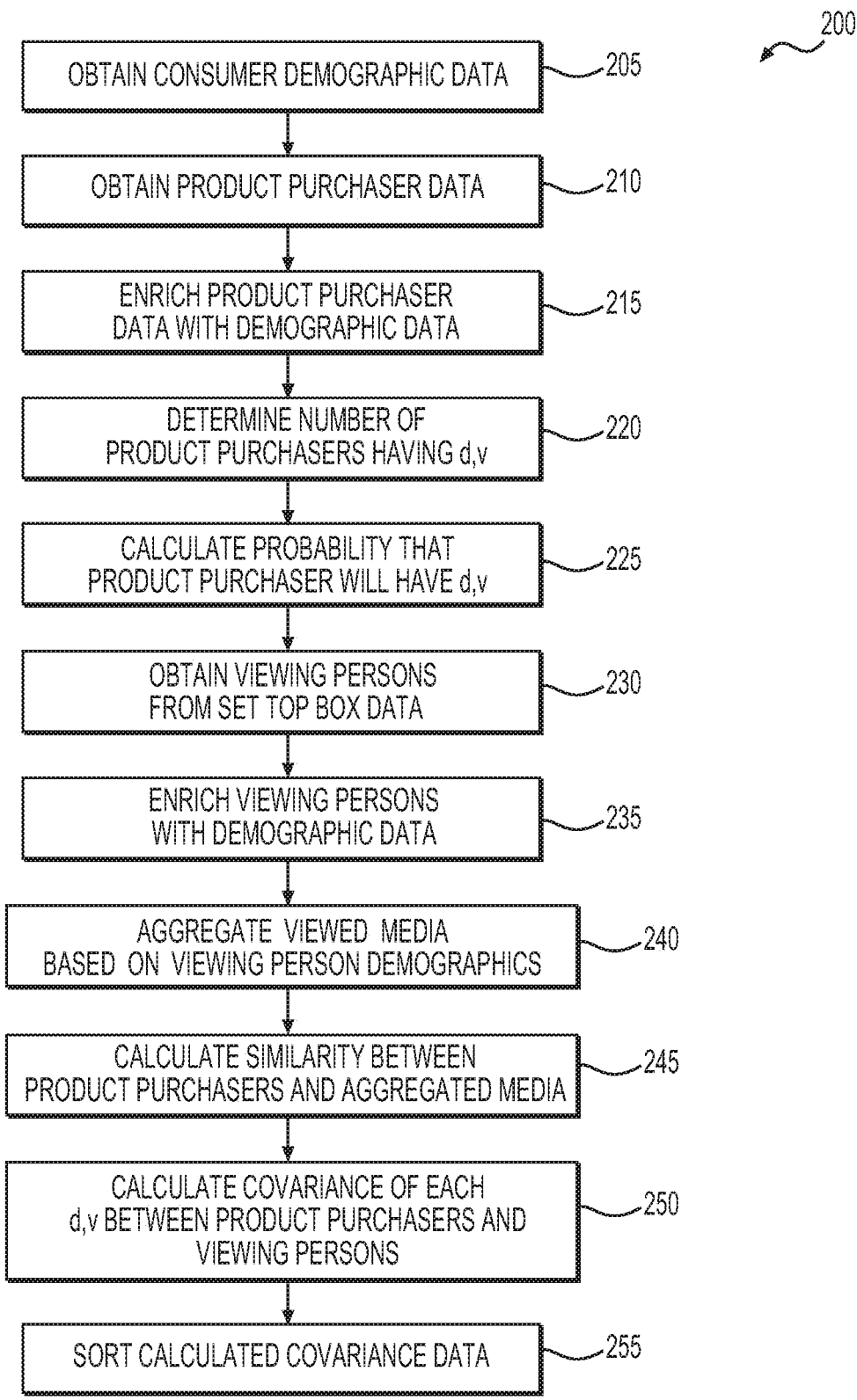
FIG. 2 depicts a flowchart for high dimensional set top box targeting, according to exemplary embodiments of the present disclosure.

FIG. 2 depicts a flowchart for high dimensional set top box targeting, according to exemplary embodiments of the present disclosure.

Figure 3A:
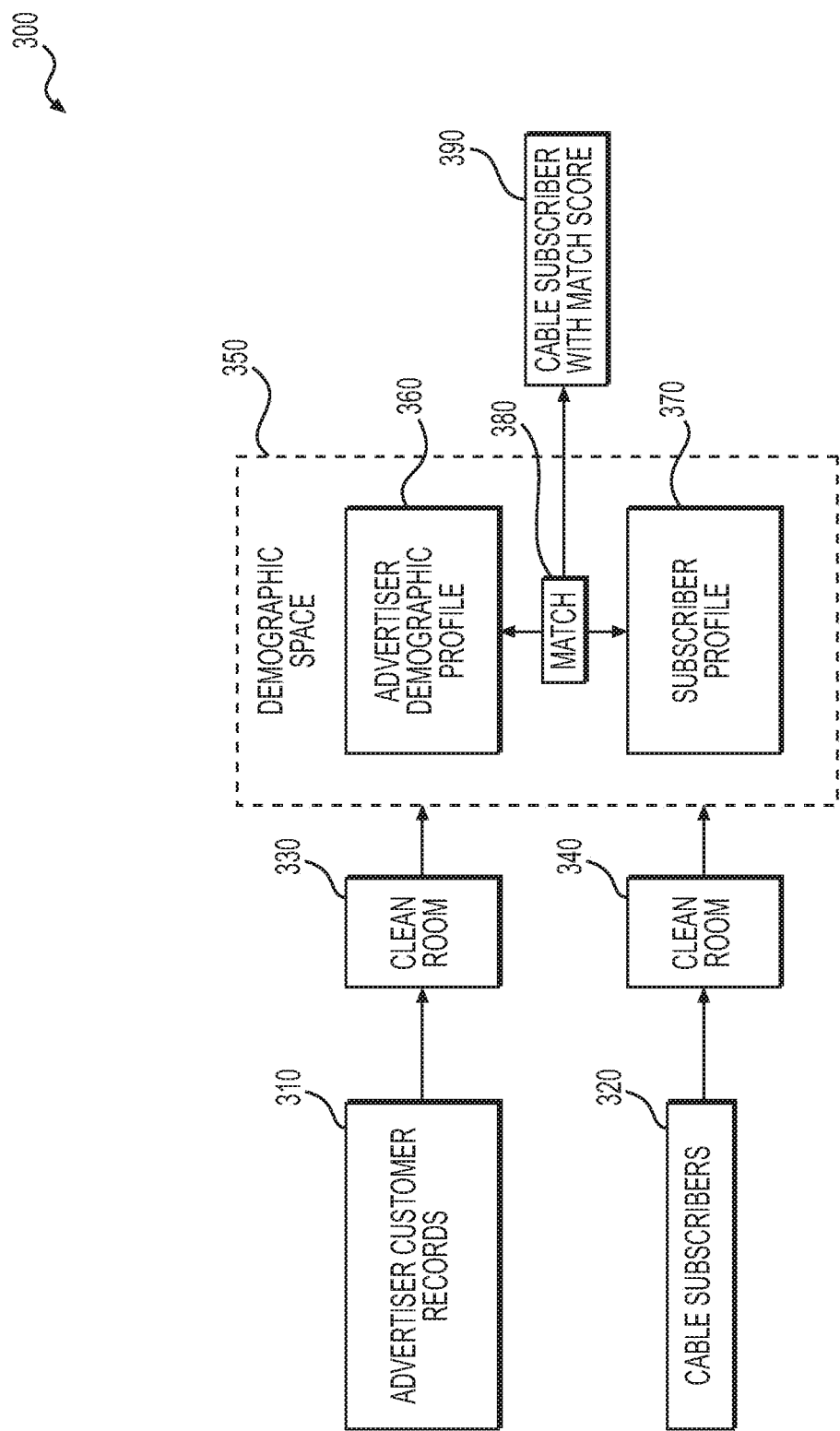
FIGS. 3A and 3B depict an addressable targeting algorithm process, according to exemplary embodiments of the present disclosure.
Figure 3B:
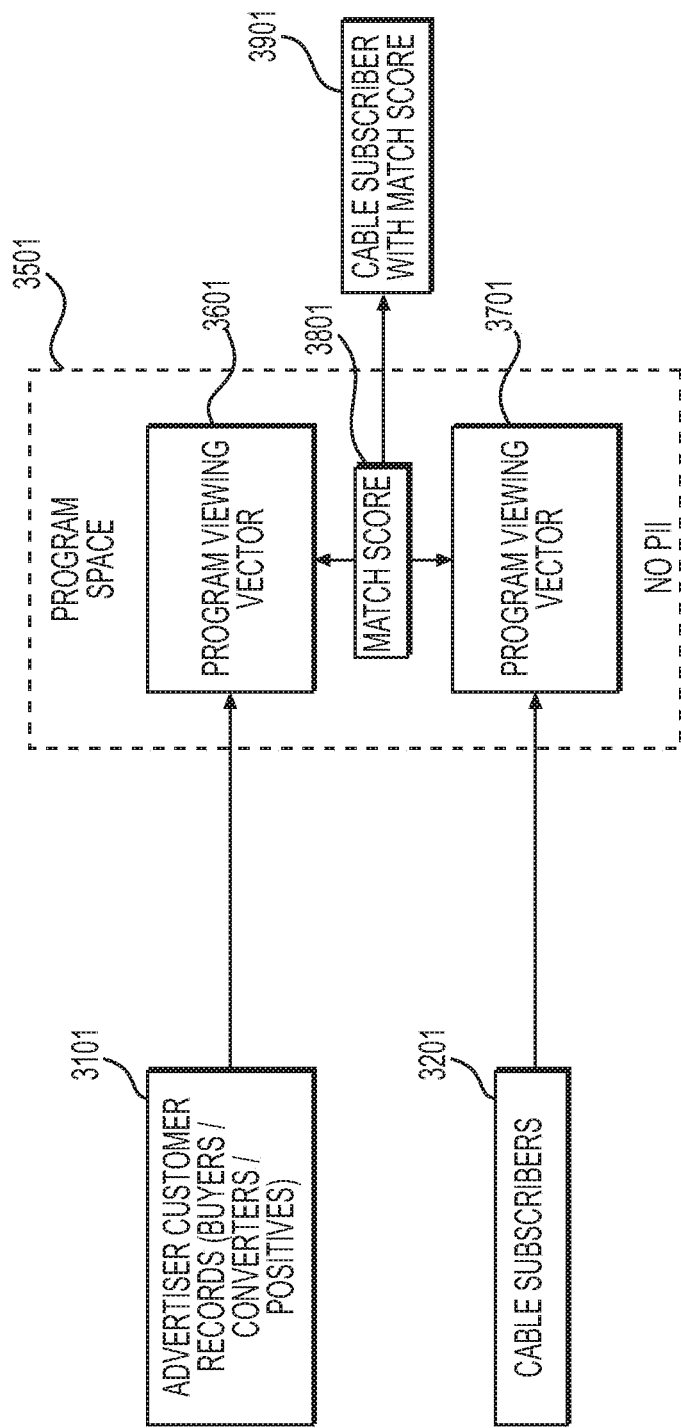

FIG. 3 shows high-level data flows for one embodiment of Addressable Algorithm D. Cable subscribers and Product purchasers are both anonymized via a "clean room," and demographics are added to both populations. A product purchaser demographic profile is then generated by aggregating the product purchaser population, where-as the cable subscriber population remains non-aggregated—each cable subscriber will be scored against the overall product purchaser profile. Then for each product-purchaser profile and cable subscriber profile, the demographic versions of the product purchasers and cable subscribers can then be compared. Finally a score is calculated based on the quality of match between product purchasers and cable subscribers. Each cable subscriber may have a score generated indicating how well they match the demographics of the product purchasers.

Figure 4:
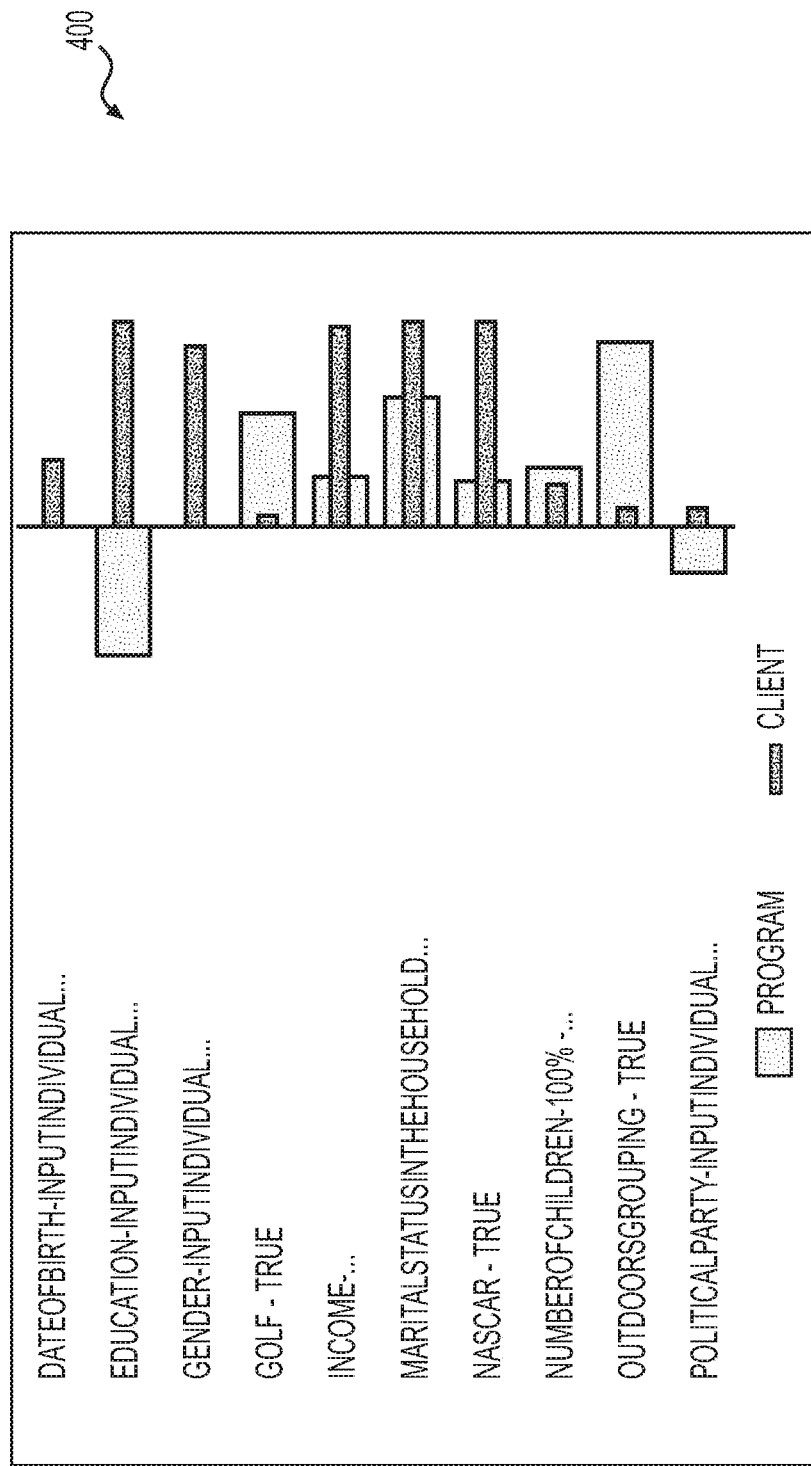
FIG. 4 depicts a schematic diagram of detailed demographic match statistics on a particular TV program and its suitability for advertising, for example, a handyman product, according to exemplary embodiments of the present disclosure.

FIG. 4 depicts the demographics of product purchasers compared to the demographics of a specific cable subscriber. The more closely do the demographics of product purchasers match the cable subscriber, the better is the cable subscriber for addressable advertising. In one embodiment, cable subscriber demographics may each be 0-1 variables where 0 means that they do not have the demographic trait, and 1 means that they do have the demographic trait. However these binary scores are then normalized by the rarity of the demographic, giving rise to the real-valued values shown in this figure.

Figure 5:
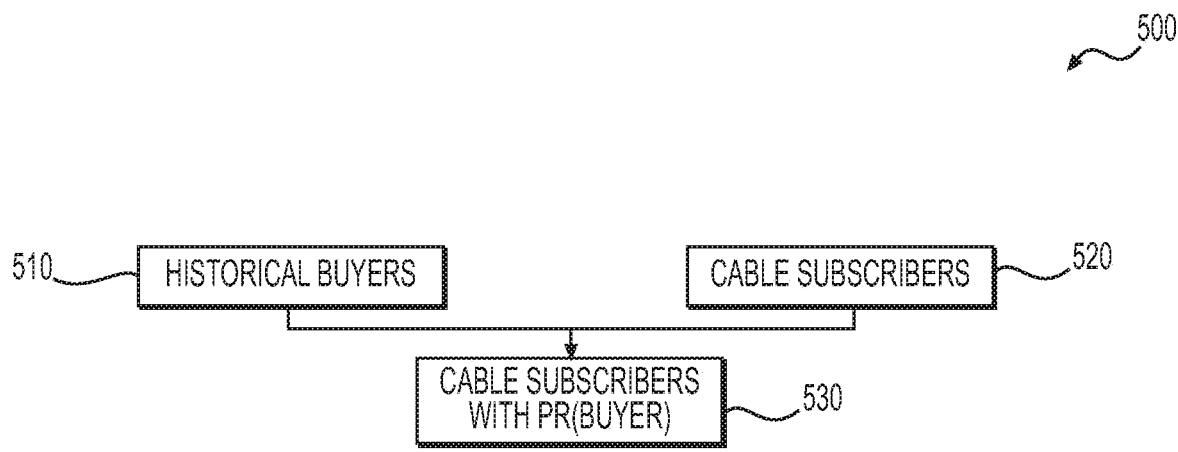
FIG. 5 depicts inputs and outputs for individual targeting using media similarity, according to exemplary embodiments of the present disclosure.

FIG. 5 depicts a very broad view of the inputs and outputs for the addressable targeting algorithms (Algorithm C and D) described in this disclosure. Given an advertiser's ad (not shown), the system takes historical buyers of the advertiser's product 110 and a new cable subscriber population 120, and scores the cable subscriber population for targeting. These scores may be estimates of the probability of buyer Pr(Buyer) or a similar score for propensity to purchase the advertiser's product 130, which may represent the probability of the cable subscriber in question being a potential buyer of the advertiser's product. Advertisers would generally desire to target higher Pr(Buyer) cable subscribers as they are more likely to receive the advertiser's messaging and potentially purchase their product.

Figure 6:
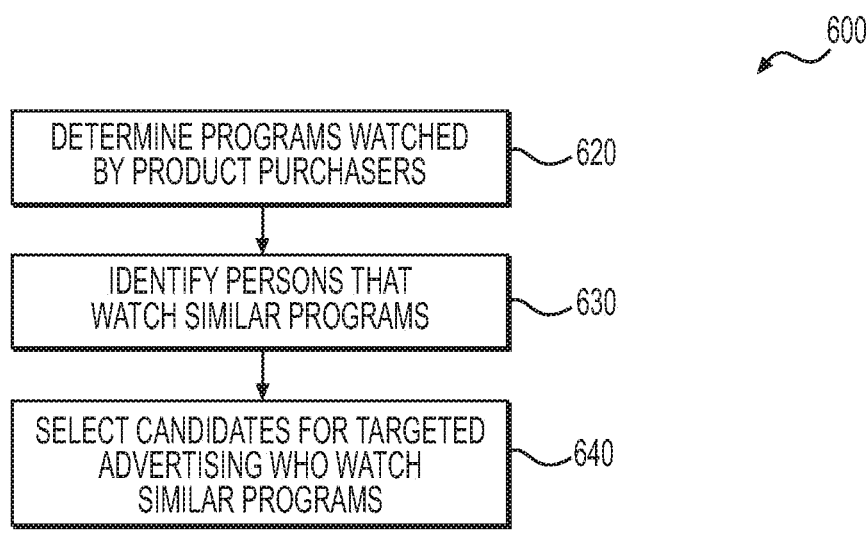
FIG. 6 depicts a flowchart of an exemplary method for individual targeting using media similarity, according to exemplary embodiments of the present disclosure.

FIG. 6 depicts a flowchart for Algorithm C described in the present disclosure. Algorithm C is an addressable algorithm which uses viewing behavior to score cable subscribers against a product purchaser population.

Figure 7:
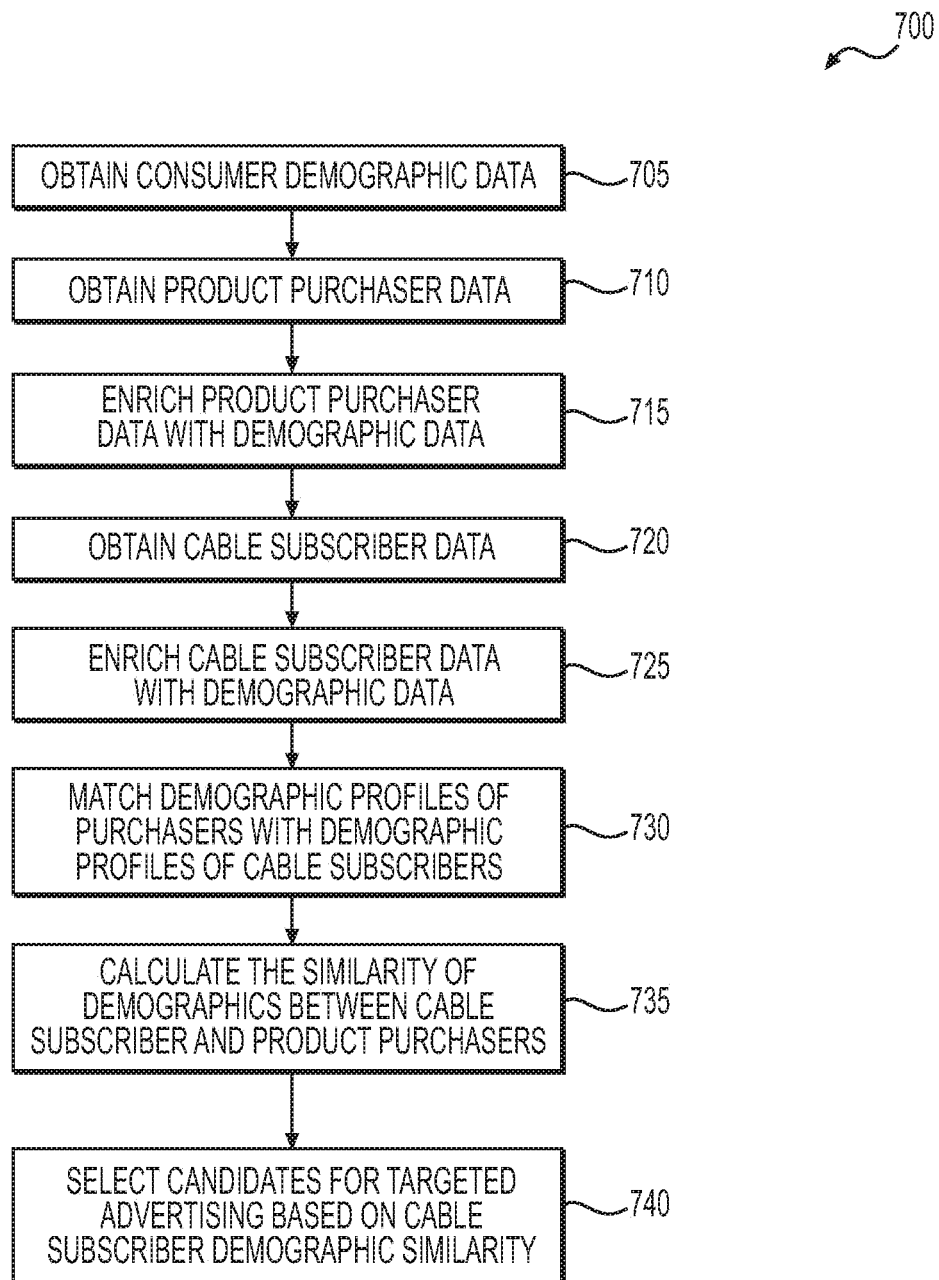
FIG. 7 depicts a flowchart of an exemplary method for individual addressable targeting using demographic similarity (labeled herein as "Algorithm D"), according to exemplary embodiments of the present disclosure.

FIG. 7 depicts a flowchart of an exemplary method for addressable targeting using demographic similarity (labeled herein as "Algorithm D").

Figure 8:
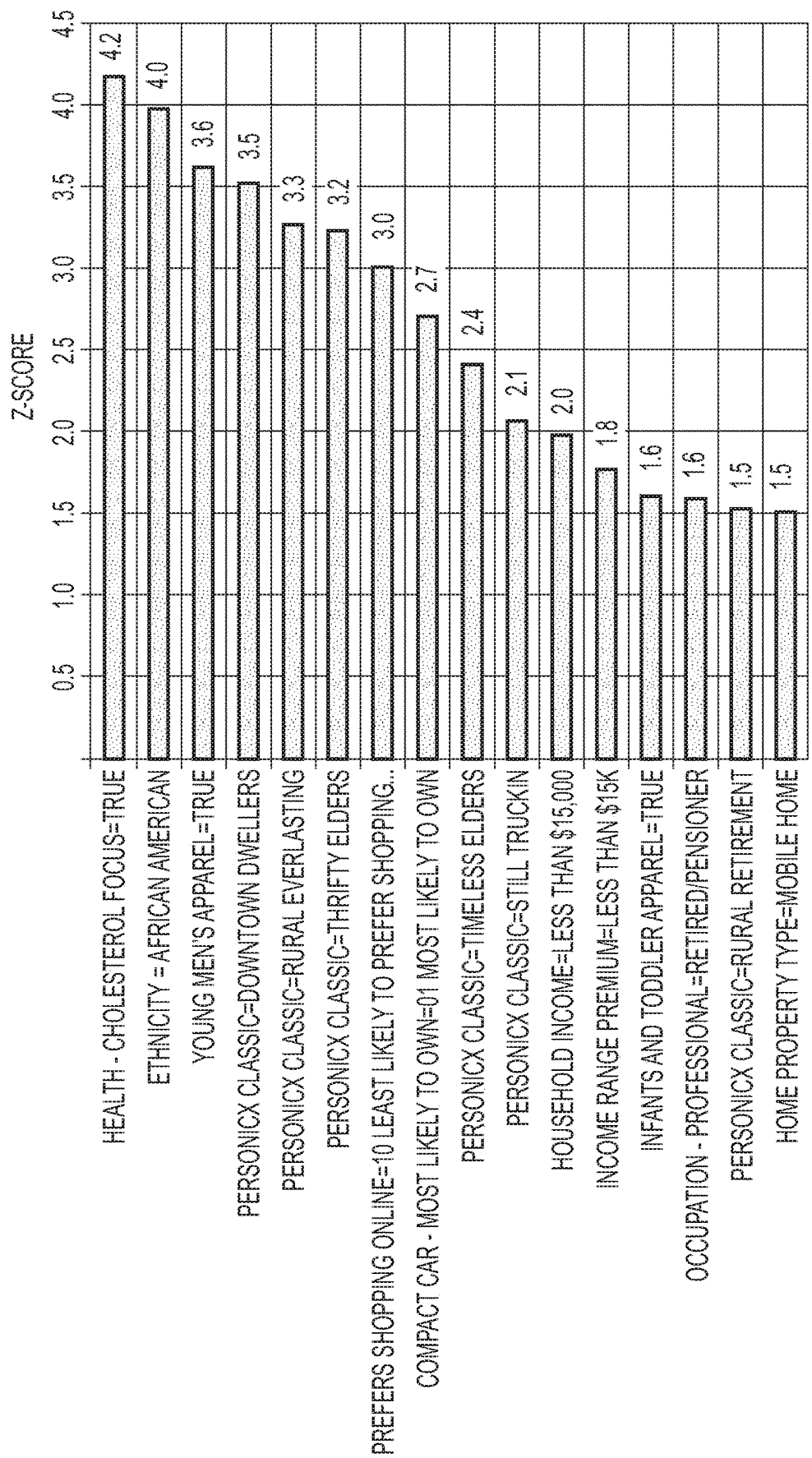
FIG. 8 depicts a graphical representation of sample demographics for an exemplary advertiser, according to exemplary embodiments of the present disclosure.

FIG. 8 depicts some of the top variables from a demographic profile generated from a population of purchasers. The demographics shown in this figure have been normalized to z-scores. In z-scores, a positive value means that the trait occurs more than that of a reference population such as US pop. This shows that for this particular purchaser population (they happen to be life insurance purchasers), they tend to have cholesterol interest, are retired or pensioners, African American, and have incomes <$15,000 per year. When we use this profile to find cable subscribers, one of the methods described (Algorithm D) measures the demographic vector match between this purchaser profile and the cable subscriber demographics—thus we should find cable subscribers who are also African American, have low incomes, are retired, and have cholesterol interest. The z-scores used here take the original trait rate of occurrence (e.g. a percentage such as 20% let's say for cholesterol interest) and converted into a standardized score by subtracting the typical rate for US population e.g. let's say about 5%) and then dividing by the standard deviation of trait occurrence as measured in the US population.

Figure 9:
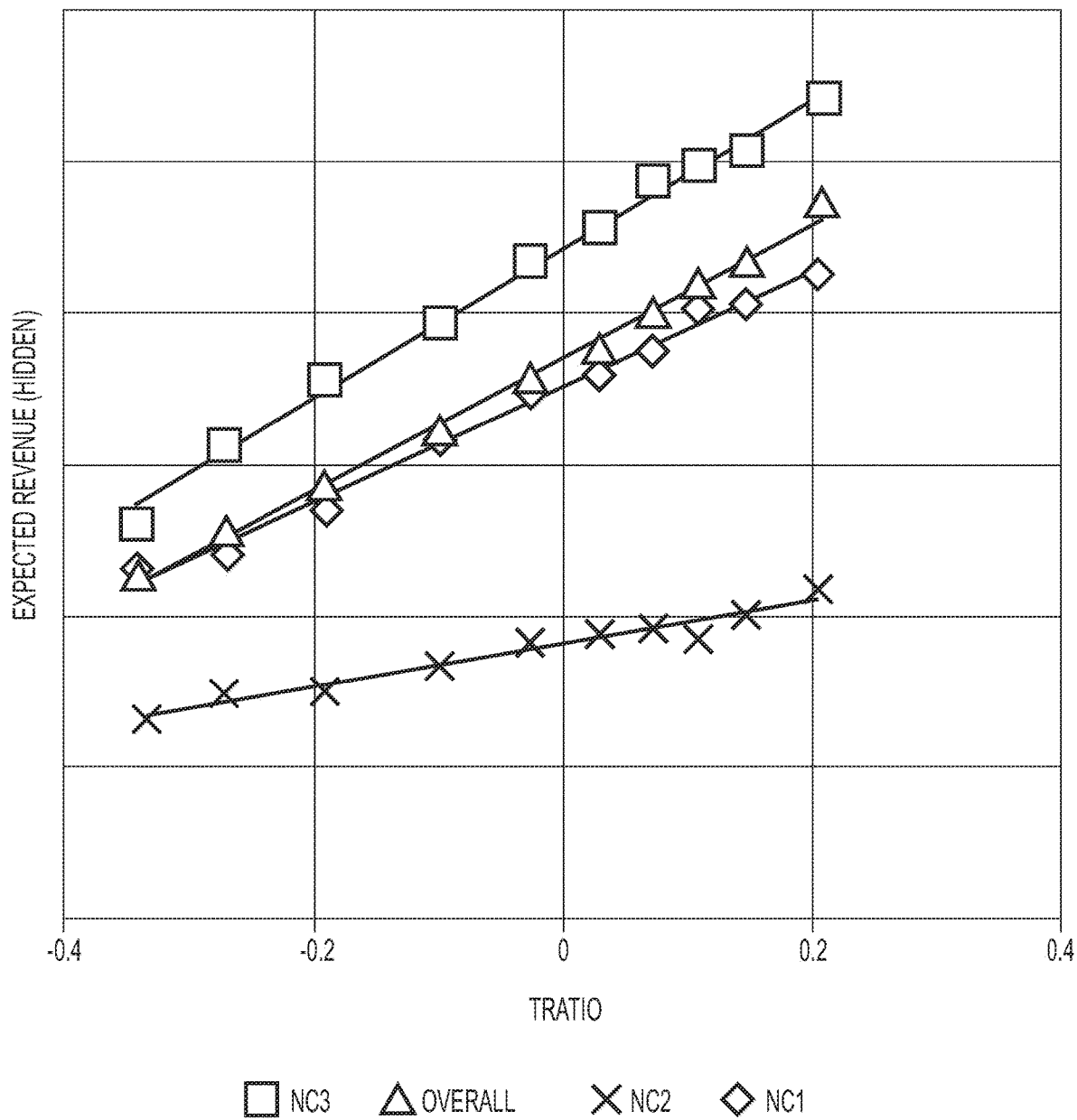
FIG. 9 depicts a graphical representation of addressable targeting score versus expected revenue from customers for an exemplary advertiser, according to exemplary embodiments of the present disclosure.

FIG. 9 shows lift analysis of an addressable targeting algorithm. A variety of current, former, and potential life insurance customers were used and each had both revenue accrued from their policies and "Months in force" as the number of months they had retained their life insurance policy. The population—for whom we knew their value—was then scored in the same way that we would score cable subscribers. They were then ordered by tratio. Their expected policy durations and revenue were then shown by tratio. The result showed that as targeting score increases, so does the expected revenue. The ratio of expected value at a given tratio and expected value for population is the lift potential due to addressable targeting algorithm. This provides an estimate of lift that the algorithm is likely to achieve when executed in a real addressable television campaign, and a means for estimating a cost-effective CPM for the addressable campaign.

Figure 10:
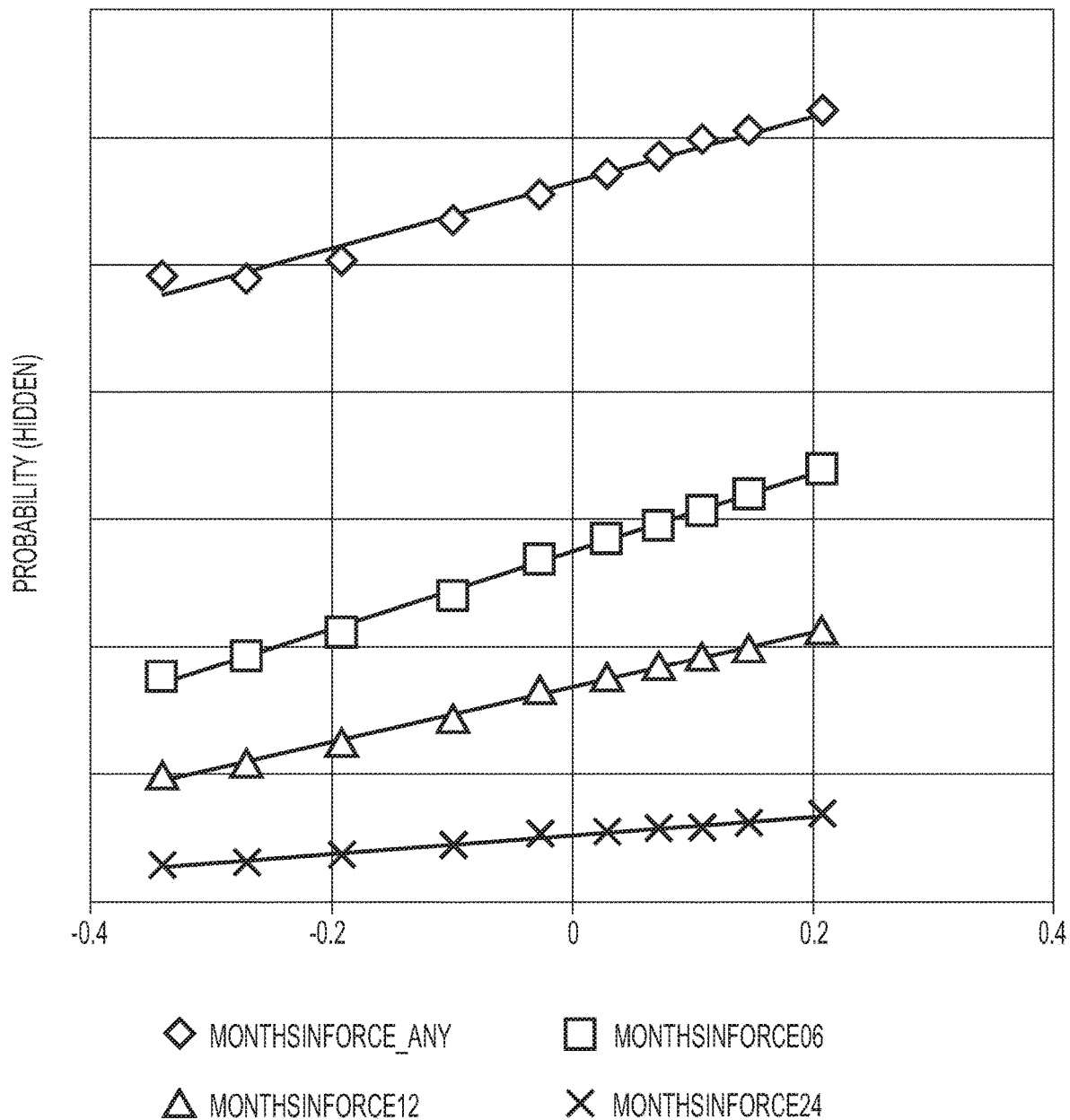
FIG. 10 depicts a graphical representation of addressable targeting score versus the time that a policy has been held by targeted persons for an exemplary advertiser, according to exemplary embodiments of the present disclosure.

FIG. 10 is similar to FIG. 9, but shows results against 3 sub-clusters for the same advertiser. Different sub-clusters could each have different value, and this shows up clearly in this graph. The different customer value, in turn, changes the calculation of expected value due to the use of the addressable targeting algorithm.

Figure 11:
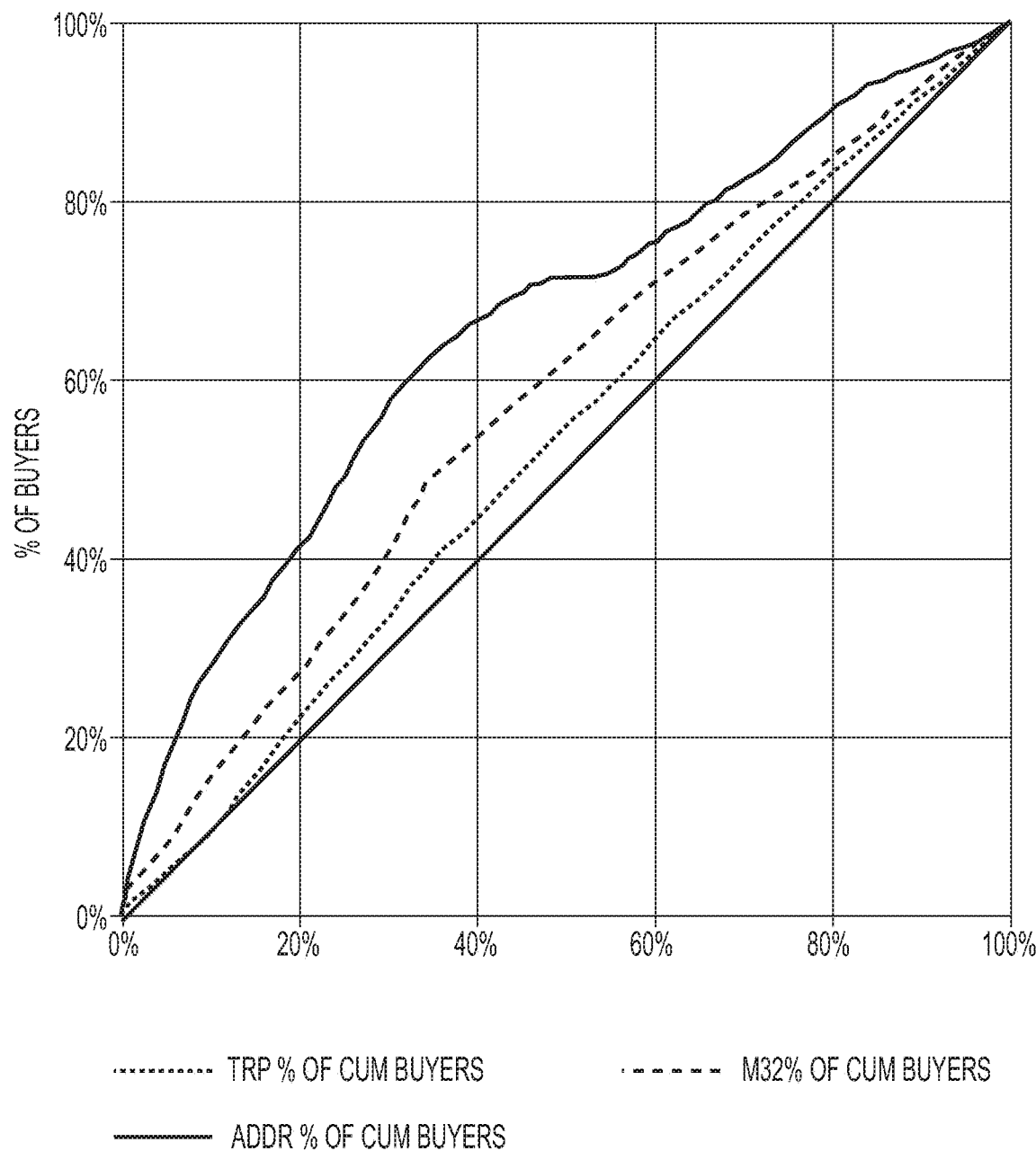
FIG. 11 depicts a graphical representation of cumulative distribution for buyers per asset from three different targeting algorithms, according to exemplary embodiments of the present disclosure.

FIG. 11 shows what kind of performance a marketer could expect if they target different amounts of assets. This figure was calculated using the Buyer per million approach of estimating lift potential—where we measure the buyer per million concentration in the cable subscriber population that would be targeted under different algorithms. An optimal algorithm would hug the left-hand axis and the diagonal line indicates random performance. For example, if the top scoring 1% of the population were targeted using Addressable targeting, the lift compared to random/mass market ads would be 9.9×. If the top 2% of subscribers were targeted, the lift would drop to 6.5×. The diagonal line shows the performance of a theoretical campaign in which assets are bought randomly.

Figure 12:
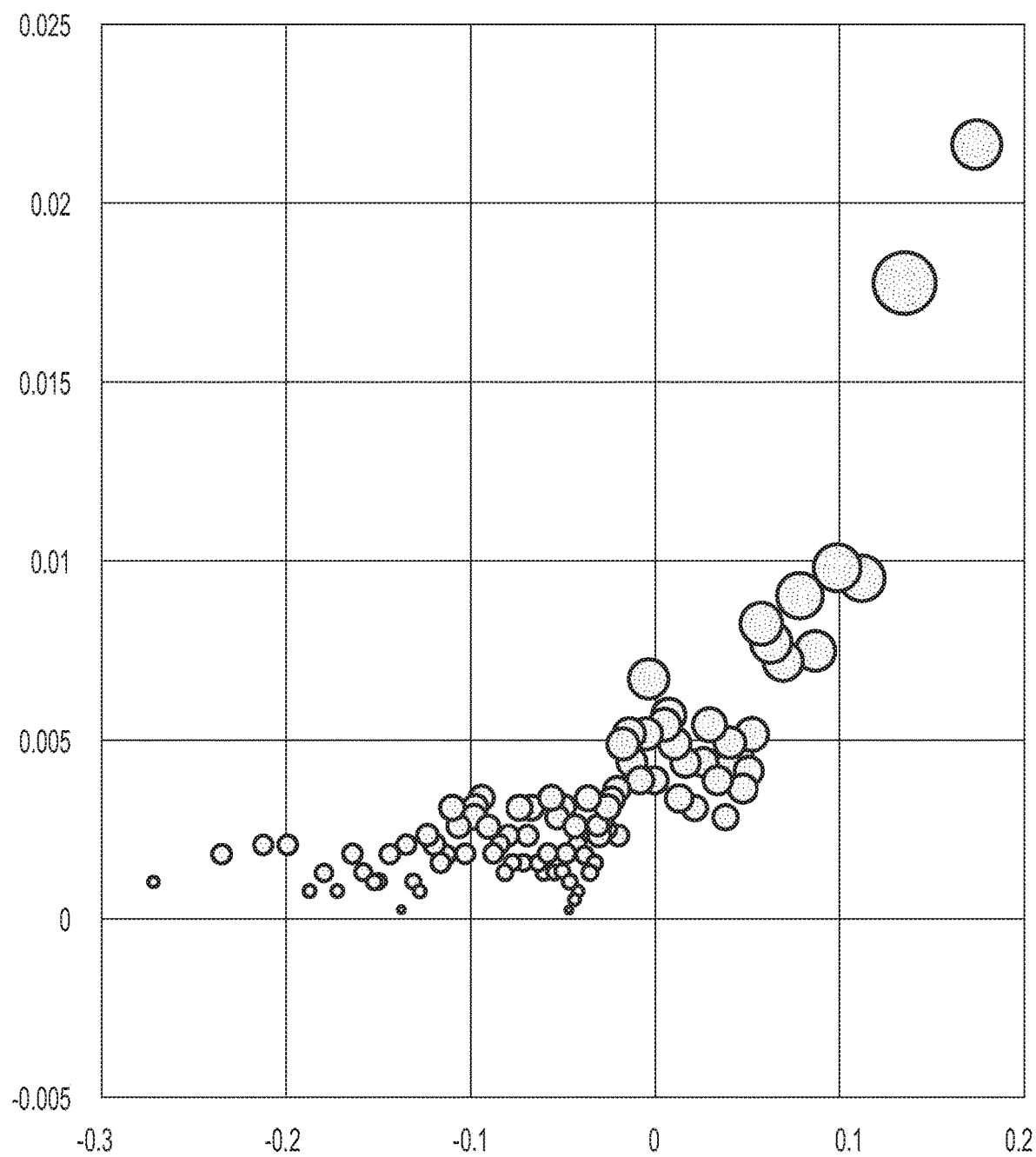
FIG. 12 depicts a graphical representation of addressable targeting algorithm performance as buyers per impression versus tratio, according to exemplary embodiments of the present disclosure.

FIG. 12 depicts a graphical representation of addressable targeting algorithm performance as buyers per impression versus tratio, according to exemplary embodiments of the present disclosure.

Figure 13:
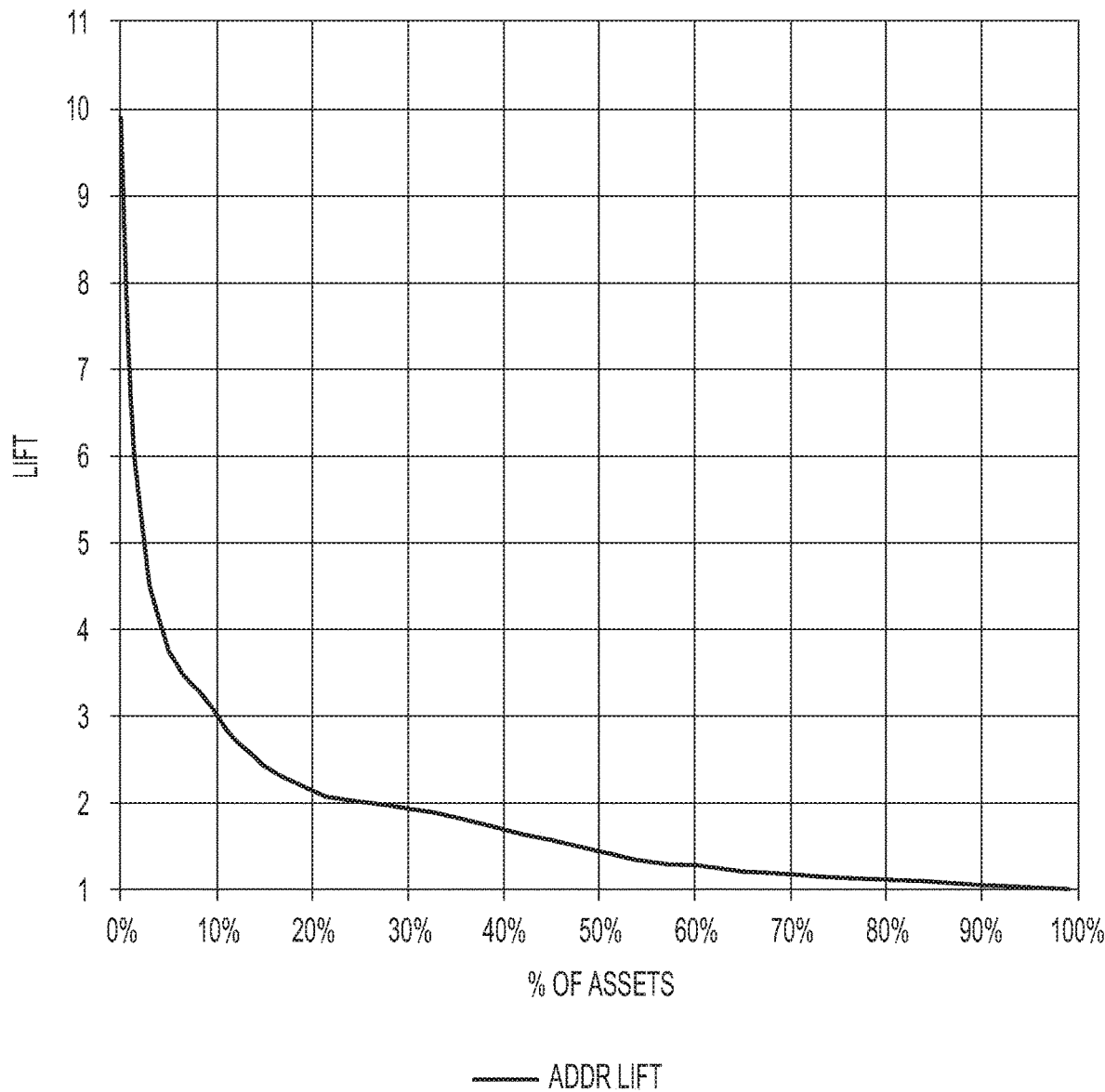
FIG. 13 depicts a graphical representation of addressable lift versus % of assets targeted, reported in percentiles, according to exemplary embodiments of the present disclosure.

FIG. 13 depicts a graphical representation of addressable lift versus % of assets targeted, reported in percentiles, according to exemplary embodiments of the present disclosure.

Figure 14:
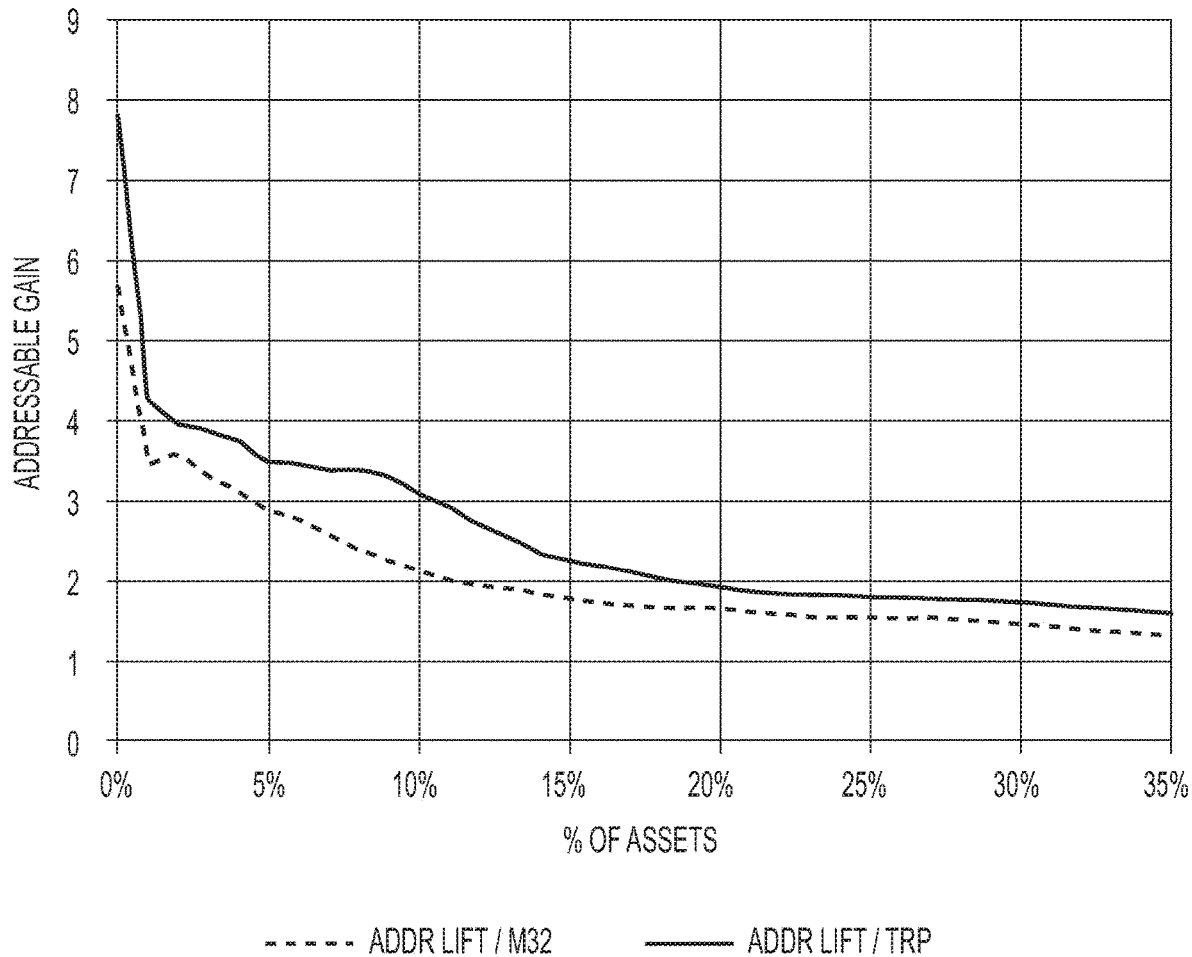
FIG. 14 depicts a graphical representation of buyers per impression ratio between addressable lift and M32 or TRP lift, according to exemplary embodiments of the present disclosure.

FIG. 14 depicts a graphical representation of buyers per impression ratio between addressable lift and M32 or TRP lift, according to exemplary embodiments of the present disclosure.

Figure 15:
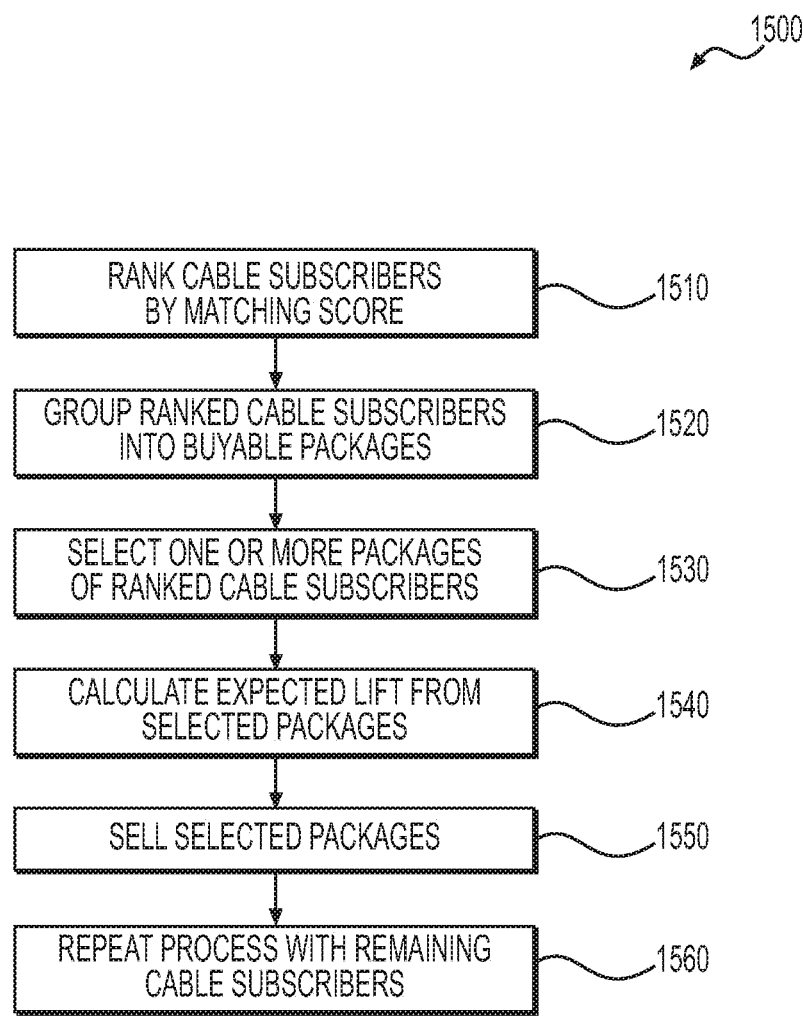
FIG. 15 depicts a flowchart of an exemplary method for an addressable market design, according to exemplary embodiments of the present disclosure.

FIG. 15 depicts a flowchart of an exemplary method for an addressable market design, according to exemplary embodiments of the present disclosure.

Figure 16:
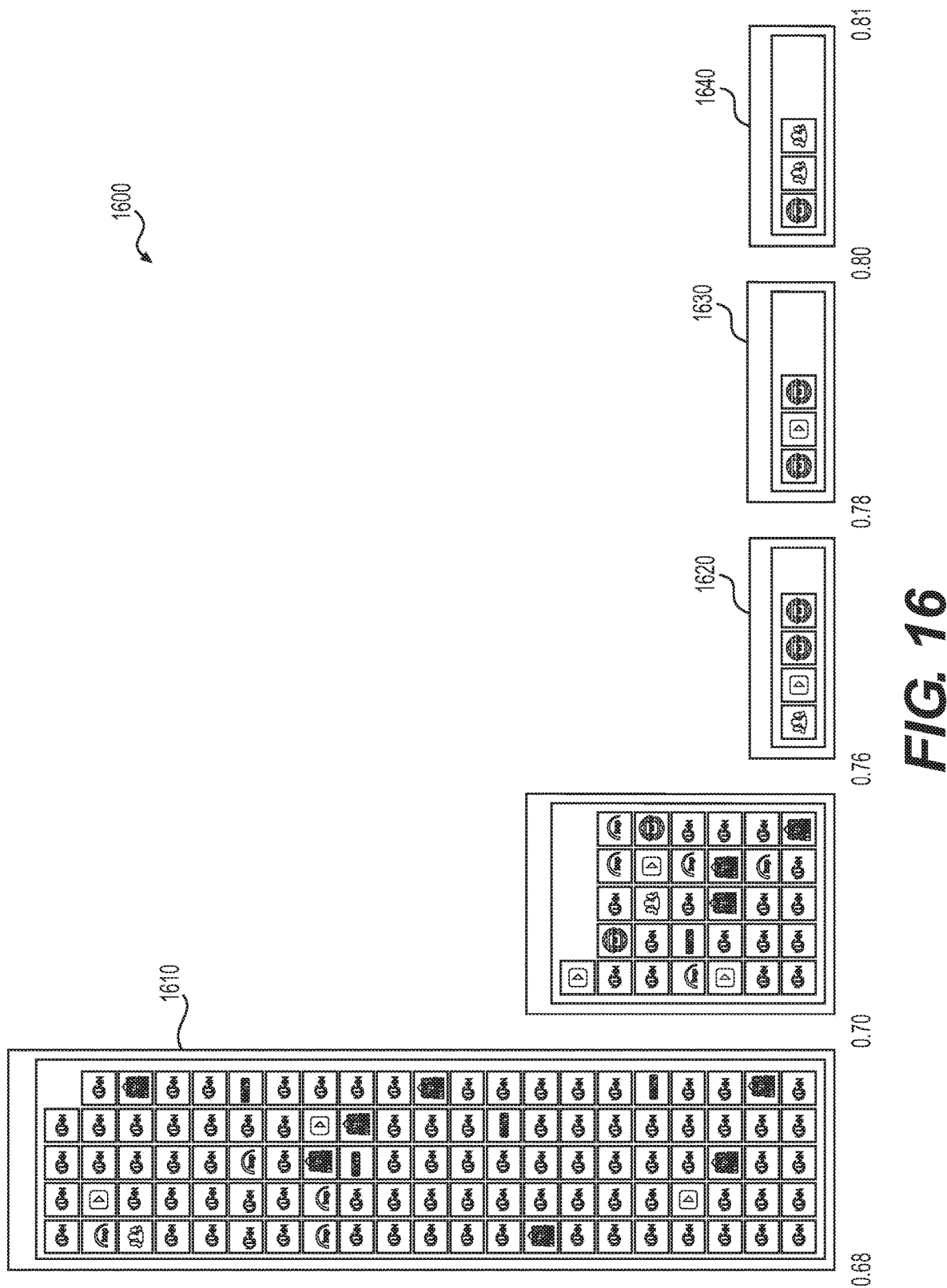
FIG. 16 depicts a sample screenshot of an exemplary set of buyable media, according to exemplary embodiments of the present disclosure.

FIG. 16 depicts a zoom out in an audience planner GUI according to exemplary embodiments of the present disclosure showing the different assets or packages that could be purchased, bucketed by tratio. The x-axis is the tratio. Each square in the column of squares may represent a buyable asset or package that has a targeting score in the tratio bucket being displayed. The higher tratio assets often can include more websites and digital segments, as it may be possible to get a more "pure" target audience with these assets, although they may also be much smaller than TV programs. TV programs may occupy many of the lower tratio buckets.

Figure 17:
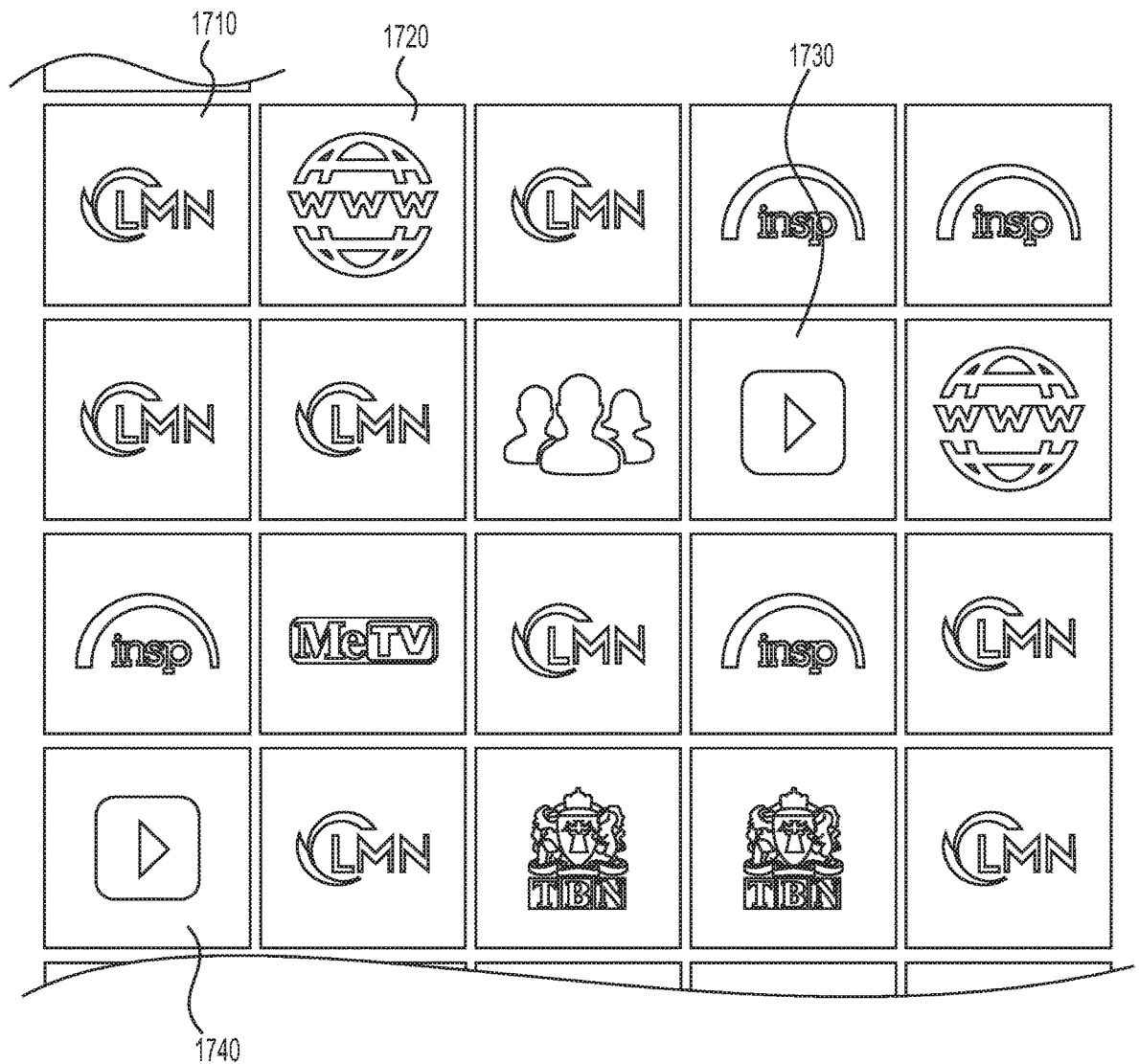
FIG. 17 depicts a sample screenshot of an exemplary set of buyable media, according to exemplary embodiments of the present disclosure.

FIG. 17 shows a zoom in of FIG. 16 with more detail. The Zoom in makes it easier to see the different icons being used to represent each asset. For example, in this particular embodiment, the "WWW" icon represents a website, and the "People" icon represents a digital segment. "Insp" represents the "Inspiration network"—a television network that runs religious programming. Addressable audiences are represented by a "Play button" icon.

Figure 18:
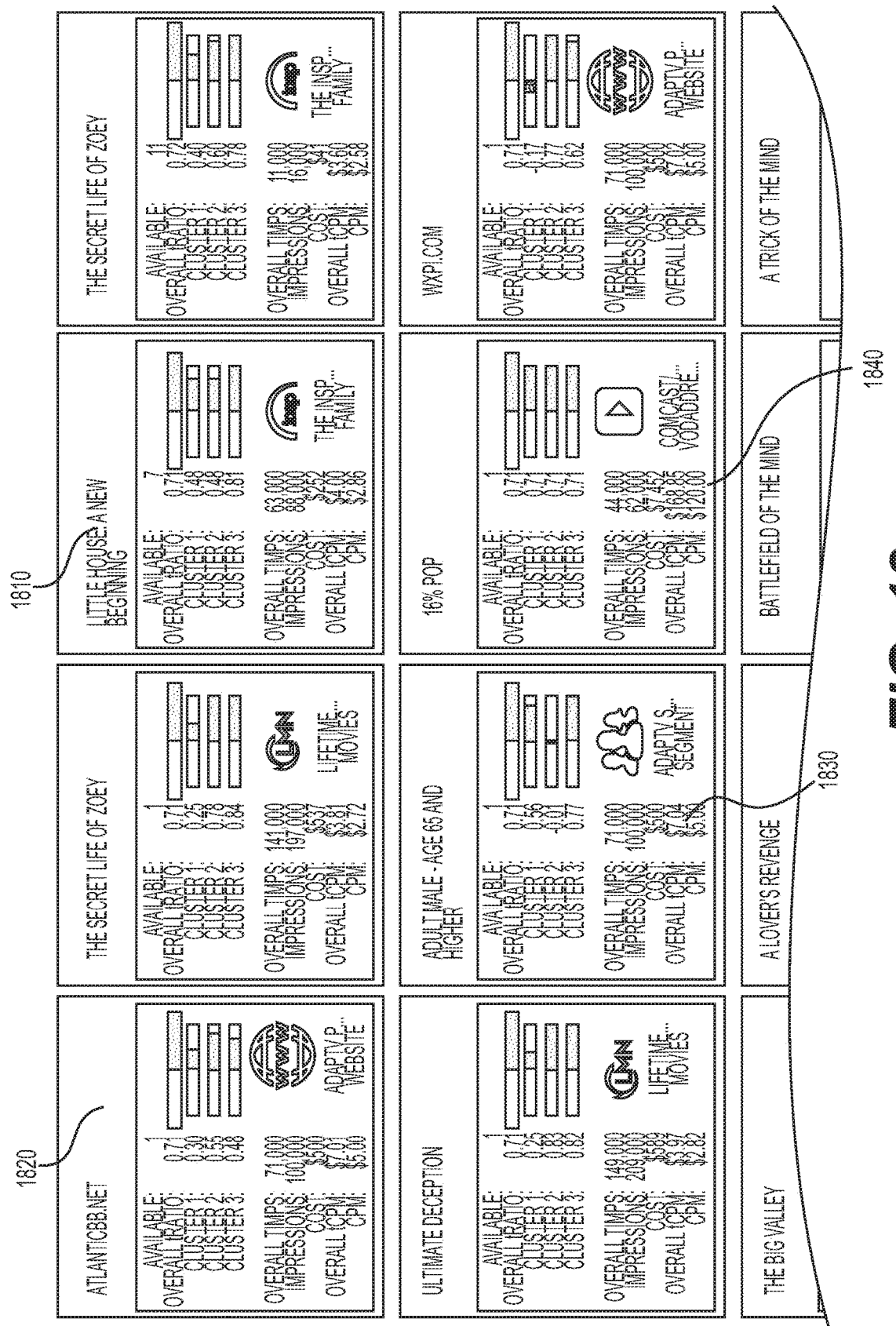
FIG. 18 depicts a sample screenshot of an exemplary set of buyable media, according to exemplary embodiments of the present disclosure.

FIG. 18 shows a set of buyable media including TV program 1810, digital segment 1830, website 1820, and "Insertable VOD" (1840). An advertiser can insert their ad to a commercial break in the TV program, can have their ad display to online persons who are members of a specific digital segment, can have their ad run on a particular website, or can run their ad—for example—in the pre-roll of a video on demand movie. "Insertable VOD (Insertable Video On Demand) 16% of Pop" (1840) is a viewer package that can be purchased that will capture the top 16% of population who are most likely to convert on the advertiser's product. Grouping the persons into a buyable "package" makes it easier for an advertiser to bid or buy the addressable product.

DETAILED DESCRIPTION OF EMBODIMENTS

Aspects of the present disclosure, as described herein, relate to systems and methods for automated television ad targeting using set top box data. Aspects of the present disclosure involve selecting a segment of TV media to purchase to insert an ad, such that advertiser value per dollar is maximized.

Various examples of the present disclosure will now be described. The following description provides specific details for a thorough understanding and enabling description of these examples. One skilled in the relevant art will understand, however, that the present disclosure may be practiced without many of these details. Likewise, one skilled in the relevant art will also understand that the present disclosure may include many other related features not described in detail herein. Additionally, some understood structures or functions may not be shown or described in detail below, so as to avoid unnecessarily obscuring the relevant description.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

The systems and method of the present disclosure allow for automated television ad targeting using set top box data.

I. System Architecture

Any suitable system infrastructure may be put into place to place to receive media related data to develop a model for targeted advertising for television media. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1, which may operate according to the descriptions of U.S. patent application Ser. No. 13/209,346, filed Aug. 12, 2011, the disclosure of which is hereby incorporated herein by reference. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. In a distributed computing environment, program modules may be located in both local and remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

II. The TV Ad Targeting Problem

A. Television Media

According to various embodiments of the present disclosure, a TV Media Instance Mi (also known as a "spot") may be used to reference a segment of time on television which can be purchased for advertising. A media instance Mi may be defined as an element of the Cartesian product of the following:

$$M_i \in S \times P \times D \times H \times T \times G \times POD \times POS \times L \qquad \text{[Equation 1]}$$

where S is Station, P is Program, D is Day-Of-Week, H is Hour-Of-Day, T is Calendar-Time, G is Geography, POD is the Ad-Pod, POS is the Pod-Position, and L is Media-Length. Stations may include Broadcast and Cable stations and may be generally identified by their call-letters, such as KIRO and CNN. Geography may include National, Direct Market Association Areas, such as Miami, Fla. and Cable Zones, such as Comcast Miami Beach. An "Ad Pod" may be a term used to reference a set of advertisements that run contiguously in time during the commercial break for a TV program. "Pod position" may be a term used to reference the sequential order of the ad within its pod. "Media Length" may be a term used to reference the duration of the time segment in seconds—common ad lengths include 30, 15, and 60 second spots.

Media may be bought in rotations, which may be subsets of the above media instances, where some of the asset is a "wildcard." For example, a media buyer could buy a Network-Day-Hour of CNN-Tues-8 pm, without specifying Pod, and could run it over several weeks. According to Nielsen Competitive Data, there are over 20 million TV ad media instances per month in the United States which an advertiser can target with their ad.

B. Addressable Television Media

A single buyable unit of Addressable TV inventory can be defined as either (1) a cable/satellite/television subscriber to target with a single ad exposure:

$$M_i^+ \in PER \qquad \text{[Equation 2-0]}$$

or (2) a combination of media insertion and person, as described below in Equation 2, which means that the TV ad targeting problem becomes one of determining which persons to target, and during which program, day, hour, and pod position.

$$M_i^+ \in M_i \times PER \qquad \text{[Equation 2]}$$

Person, or PER in Equation 2-0 or 2, typically refers to an individual set top box device—in general television systems don't know exactly which person in a household is viewing at any time. Often the cable subscriber's billing name and address is used as a proxy for person, and other members of the household are able to be added as potential viewers from the demographic enrichment process.

Delivery of the ad with addressable television systems is another area where there can be some differences from system to system. Current addressable TV systems often have the ad cached on the viewer's set top box, and when they watch television, they overlay the ad over a standard television spot. Some addressable systems place the ad in places other than standard advertising pods, such as on navigation screens or as a pre-roll to video on demand content. However, conventional ads could be sold into such positions as well. Because of this we will regard these within-video-stream pre-rolls, navigation placements, etc. as all being possible placements of our previous definition Mi.

Finally, we have so far talked about targeting an individual unit of addressable media—usually a person. It is possible to also define a set of this inventory, which we could call a "package" Package={Mi+}. In the television advertising industry, "Packages" are often the name given to traditional television media where ads are bundled into different programs. However here we will find the term useful for describing a buyable block of population possibly including media placement specifications. We will discuss this more in a later section when we talk about the operation of a market for addressable inventory.

Embodiments of the present disclosure focus methods for targeting and delivering to probable buyers.

C. Example Objective

In one embodiment, the ad targeting problem for the advertiser is to select a set of one or more media $\{M_i\}$ such that the expected number of buyers reached per impression is maximized, per dollar spent on advertising:

$$M_i^+ : \max \frac{r_\Omega(\{M_i^+\})}{CPM(\{M_i^+\})} \quad \text{[Equation 3]}$$

where $r_\Omega(\{M_i^+\})$ are the buyers per impression viewing the media "package" and $CPM(\{M_i^+\})$ is the cost per thousand persons who would be delivered the addressable advertisement. The price $CPM(\{M_i^+\})$ for addressable inventory is often available from the network as "rate cards" or list prices for selling their addressable inventory. A seller of addressable inventory could also set $CPM(\{M_i^+\})$ dynamically using the calculation of $r_\Omega(\{M_i^+\})$—the more valuable are the addressable persons, the higher can be the price for those persons. The unknown, however, is the intrinsic lift that is possible using addressable versus media targeting in terms of buyers reached. Thus, the problem we will initially focus on is estimating $r_\Omega(\{M_i^+\})$ and specifically, finding a set of persons that have very high values for $r_\Omega(\{M_i^+\})$ for the advertiser in question. There are several methods for estimating $r_\Omega(\{M_i^+\})$, and we will now describe some of these techniques for conventional media as well as addressable media.

III. Spot Television Targeting Approaches i. Target Rating Points ("Algorithm A")

Target Rating Points (TRPs) on age-gender demographics are a traditional method for targeting conventional television spots. This form of targeting defines a "Target Rating Point" as the number of persons who match the advertiser's target demographics divided by total population in a targeted area. In order to convert this into a measure of precision, it may be expressed as number of persons who match the advertiser's demographics divided by total viewing persons and multiplied by 100. Therefore, 100 means that of the people watching a particular program, all of them were the desired target. It is common to use this technique on Nielsen reported age and gender counts.

In one embodiment, where $\overline{P}_{d,v}$ may be defined as the demographics of the set of persons who the advertiser wishes to target. A demographic value $p_{d,v} \in \{0,1,MV\}$ may be defined to be a formal proposition about the person p of the form d=v, e.g., income=$50K . . . $60K. The proposition $p_{d,v}$ equals 1 if it is true, 0 if false, and missing value (MV) if it is unknown. Q(Mi) may be defined as a set of viewers who are watching TV media instance Mi and where this viewing activity is recorded by the Nielsen panel and qk∈Q(Mi) where # may be defined as the cardinality of a set, and #$r_T$ may be defined as persons that match on all demographics, then the TRPs for Media Instance Mi can be defined as follows:

$$r_\Omega(M_i^+) = TRP(P, M_i) = r(P, M_i) = 100 \cdot \frac{\#r_T(M_i, \overline{P})}{\#Q(M_i)} \quad \text{[Equation 4]}$$

where $q_j \in r_T(M, \overline{P})$ if $\forall d,v: q_{j,d,v} = \overline{P}_{d,v}$ and no values can be missing. For example 50 means that 50% of the people are a match to the desired demographics.

Age and gender demographics are used widely for target rating points. This begs the question of why other demographics (e.g. income, number of children, interest in fishing, purchaser-of-petite-apparel) aren't also used. A close analysis of the targeting formula suggests that it appears to be quite problematic to use a larger number of rich demographic descriptions. One issue is panel size: Nielsen's panel only has 25,000 people distributed across 210 Direct Marketing Association areas, so about 119 people per area. There have been media reports of major rating shifts due to a single African American panelist moving, which is possible given that on average there would only be 16 African Americans per area. As a result, rare demographics may well have too few persons to be usable, where age and gender may be the only demographics exposed because they are the only demographics with enough data to be reliable.

Another issue is treating the demographics as predicates has an adverse effect on the amount of media that meets the user's criteria. Even with a broad age-gender combination such as Male 25-34, the subset that meets that definition is only 1.8% of the full population. Therefore in a program with 100,000 viewers, 1,800 would match the target at random. The subset shrinks even further if an advertiser attempts to target using more demographics. With 3,000 demographics specified, almost no people will have the exact same demographic readings that the advertiser is trying to reach, and so the method will routinely report 0% in the target group or statistically unreliable numbers.

In summary, because the TRP measure uses Boolean expressions where a target is in or out—this tends to mean that additional variables used to describe the population exponentially decrease the population that is "in-target." Every additional descriptor cuts down the pool of targetable people, making it very hard to use any more than 2 or 3 demographics in practice.

The root problem is there is no concept of "similarity" in the Target Rating Points scheme—for example, 35 year old females are similar to 34 year old females, yet the 35 year olds are outside of the 25-34 target. Ideally it would be possible to use thousands of demographics to help describe a target. The Algorithms that are described next use similarity based schemes for matching media rather than Boolean expressions.

ii. High Dimensional Set Top Box Targeting ("Algorithm B" or "M32")

We now describe an algorithm that addresses some of the limitations inherent with the TRP algorithm, and works on traditional television media. The algorithm is illustrated in FIG. 2.

In one embodiment, P may be defined as a set of persons who have purchased an advertiser's product. (210). $p_j \in P$ is a person in the set to be targeted.

Commercially available consumer demographics may then be obtained (205) in order to enrich each of the product purchaser persons with D=3,000 demographics. Let each demographic trait be represented as a 0-1 variable, where 0 means the person doesn't have the trait, and 1 means they do have it. We can then define a demographic vector for each person p as $p_{j,d,v} \in \{0,1,MV\}$ (215).

Let #$P_d$ be the cardinality of the set of persons who have the demographic d with any value v that is non-missing. Calculate $\overline{P}_{d,v}$ for each demographic d,v—as the probability of a demographic proposition d=v being true in the advertiser's set of purchasers (225).

$$\overline{P}_{d,v} = \frac{1}{\#P_d}\sum_{p_j \in P} p_{j,d,v} \quad \text{[Equation 5]}$$

We can regard $\overline{P}$ as a desirable demographic probability vector. This profile can now be targeted on TV media according to embodiments of the present disclosure.

The system next obtains viewing activity from set top box persons (230) and enriches the set top box viewing persons with the same D=3000 demographics (235).

An example set of Set Top Box viewing activity is shown in Table 1. Table 1 includes actual Set Top Box viewing record for exemplary Person 10195589 showing station, program, and date. The demographics for this viewer include "Male," "Owns SUV", "Age=44-45", "Interest in spectator sports," "motorcycle racing," "football," "baseball," and "basketball."

TABLE 1

An example set of preson-level set top box records with fields (Network (StationCallLetters), Person (PersonKey), DateTime, ViewMinutes (Mins), Program (ProgramName))

| Network | Person | DateTime | Mins | Program |
|---|---|---|---|---|
| ESPN | 10195589 | Mar. 10, 2012 15:00 | 22 | College Basketball |
| SCIFI | 10195589 | Mar. 10, 2012 15:00 | 7 | Survivorman |
| SCIFI | 10195589 | Mar. 10, 2012 15:30 | 4 | Survivorman |
| ESPN | 10195589 | Mar. 10, 2012 15:30 | 26 | College Basketball |
| ESPN | 10195589 | Mar. 10, 2012 16:00 | 30 | College Basketball |
| ESPN | 10195589 | Mar. 10, 2012 17:30 | 12 | College Basketball |
| ESP2 | 10195589 | Mar. 10, 2012 17:30 | 17 | NASCAR Racing |
| ESP2 | 10195589 | Mar. 10, 2012 18:00 | 30 | NASCAR Racing |
| ESP2 | 10195589 | Mar. 10, 2012 18:30 | 7 | NASCAR Racing |
| ESPN | 10195589 | Mar. 10, 2012 18:30 | 2 | College Basketball |
| SCIFI | 10195589 | Mar. 10, 2012 18:30 | 21 | Survivorman |
| ESPN | 10195589 | Mar. 10, 2012 19:00 | 3 | College Basketball |
| ESP2 | 10195589 | Mar. 10, 2012 19:00 | 22 | NASCAR Racing |
| ESP2 | 10195589 | Mar. 10, 2012 19:30 | 12 | NASCAR Racing |
| NICK | 10195589 | Mar. 10, 2012 19:30 | 29 | Victorious |
| ESPN | 10195589 | Mar. 10, 2012 19:30 | 18 | College Basketball |
| NICK | 10195589 | Mar. 10, 2012 20:00 | 9 | Big Time Movie |

Embodiments of the present disclosure may then aggregate each piece of media Mi (e.g., Survivorman 3:00 pm, 3/10/2012 in Table 1) into an identically sized D-dimensional demographic vector $\overline{M}_i$ based on the set of persons who viewed that television program (240) as shown below:

$$\overline{M}_{i,d,v} = \frac{1}{\#Q_d(M_i)}\sum_{q_k \in Q(M_i)} q_{k,d,v} \quad \text{[Equation 6]}$$

A similarity or "tratio" r between advertiser target $\overline{P}$ and media $\overline{M}_i$ may be defined as the correlation coefficient between the product and media demographic vectors (245).

$$tratio(\overline{P}, \overline{M}_i) = r(\overline{P}, \overline{M}_i) = \frac{\overline{P}^+ \cdot \overline{M}_i^+}{|\overline{P}^+| \cdot |\overline{M}_i^+|} \quad \text{[Equation 7]}$$

$$\overline{P}_{d,v}^+ = \frac{\overline{P}_{d,v} - \mu_{d,v}}{\sigma_{d,v}}; \overline{M}_{i,d,v}^+ = \frac{\overline{M}_{i,d,v} - \mu_{d,v}}{\sigma_{d,v}} \quad \text{[Equation 8]}$$

$u_{d,v}$ and $\sigma_{d,v}$ are the mean and standard deviation of the demographic from an unbiased US population. Embodiments of the present disclosure may exclude any demographics (convert them to missing) if they have fewer than B=25 people.

IV. Addressable Targeting Algorithms

Addressable television targeting differs from conventional TV media targeting in that it is scoring cable subscribers rather than programs. The problem for an addressable targeting algorithm, as illustrated in FIG. 5, is to take historical buyers 110 and a new cable subscriber population 120, and to score the cable subscriber population for targeting with the advertising as Pr(Buyer) 130, the probability of being a buyer.

We will now describe two embodiments for addressable targeting:

A. Individual Addressable Targeting Using Media Similarity ("Algorithm C")

One approach illustrated in FIG. 6 is to decompose persons into a vector of network-program viewing propensities. Embodiments of the present disclosure may find the set of programs watched by buyers (620) and then may find cable subscribers who over-index on those same programs (630), and these may be selected as candidates to target (640). This may be a good option for TV Cable Operators because they may use their own set top box viewing data to drive the match possibly without any third party data being required.

Embodiments of the present disclosure may implement such an algorithm according to the following pseudo-code:

Pseudo-Code for Algorithm C

1. Let P equal the set of cable subscribers who could be targeted using the addressable ad delivery systems.

2. Let B equal the set of buyers who have purchased an advertiser's product or service. This set of buyers is usually provided by the advertiser. It is also possible to define a "proxy target" which is a set of persons identified by some algorithm (e.g. high-income 20 year olds). We need a set of people as a "seed target."

3. For each cable subscriber p∈P, calculate their viewing minutes as a percentage of time spent on each station-program versus all viewing minutes for the cable subscriber. This comprises the following sub-steps:

3a. Canonicalize Program Names: "The Walking Dead" and "The Walking Dead Mon" may both appear as program names in a television schedule. The latter might refer to the "Monday encore" of the premiere Walking Dead episode that airs on Sunday night. However the different strings used in the program name unfortunately fragment the viewing behavior. This makes it more difficult to get a clear signal around cable subscriber viewing preferences. Therefore it may be canonicalized into a "mastered" version of the program name, "The Walking Dead." Canonicalization can be performed using a lookup table that maps the different string forms of the program to a standardized string. Table C shows an example of the canonicalization table. Program MasterID in Table C is a unique "Program Master" identifier for the canonicalized program name. ExternalProgramTitle refers to string variants that map to the canonical version.

TABLE C

Example from Mapping Program Name Variations table 3b. Generate Set Top Box data with (PersonKey, DateTimeStart, Station, Program, Viewing Minutes). This entails the following steps:

| Program Master Id | External Program Title |
|---|---|
| 154 | The Walking Dead |
| 154 | Walking Dead |
| 154 | Walking Dead Marathon |
| 154 | Walking Dead Enc |

3b1. Obtain raw Set Top Box channel change event data on cable subscriber viewing events. This data generally comprises a record such as (PersonKey, DateTime, ChannelViewed). The PersonKey is actually a mapping from the Set Top Box DeviceID to the household (usually represented as the cable subscriber's name and address, although the specific personally identifiable information is usually converted into an anonymousID to protect personal privacy). Throughout our descriptions we usually refer to Personkeys, however we note that HouseholdIds would also work for many of the applications described. It is also possible to apply filters to the Households, for example, only using households with 1 device, so as to increase the signal strength, or filtering out households that have >x devices. For example, households with six or more devices could be hotels, and for these kinds of households, the viewing activity of the known cable subscriber may have little relationship to the viewing data for the entirety of the household. Filtering down the set of households being used can help to increase signal strength for vector matching.

TABLE D

Example data from Households Table. This table maps households to personkeys. Personkeys are anonymized person name-addresses and can be equal to the cable subscriber who is paying for the service.

| Household Id | Person Key | Market Master Id | Zipcode | Update Date |
|---|---|---|---|---|
| 1 | 10236545 | 275 | 18431 | Sep. 1, 2011 |
| 2 | 10241750 | 275 | 18071 | Sep. 1, 2011 |
| 3 | 10266571 | 275 | 18445 | Jan. 27, 2012 |
| 4 | 10228206 | 76 | 16912 | Jan. 27, 2012 |
| 5 | 10238532 | 193 | 18053 | Sep. 1, 2011 |
| 6 | 10275284 | 275 | 18322 | Sep. 1, 2011 |
| 7 | 10236807 | 275 | 18466 | Sep. 1, 2011 |
| 8 | 14560233 | 275 | 18466 | Jan. 27, 2012 |
| 9 | 10179306 | 275 | 18466 | Sep. 1, 2011 |
| 10 | 10211165 | 76 | 16912 | Sep. 1, 2011 |

3b2. Using the Zipcode from the address that we have for the PersonKey, and a look-up to the television schedule running on that day using Station and DateTime, process the above raw record into (PersonKey, Bin (DateTime), StationMasterID, ProgramMasterId, MarketMasterId). Note that Program Name is derivable from Program MasterID, and CallLetters (or sometimes called Station) are derivable from StationMasterID. MarketMasterID is also derived from Zipcode and represents the geographic broadcast area (Direct Marketing Area) where the person is located. Local broadcast television stations operate in different areas, and so this makes it possible to lookup the correct local station given viewing activity on a national network such as ABC.

TABLE E

HouseholdViewingHistory Table

| Bin (DateTime) | Person Key | Station Master ID | Program Master Id | Market Master Id |
|---|---|---|---|---|
| Oct. 2, 2013 0:00 | 2081102 | 710 | 13 | 9 |
| Oct. 2, 2013 1:30 | 2081102 | 710 | 685 | 9 |
| Oct. 2, 2013 2:00 | 2081102 | 710 | 685 | 9 |
| Oct. 2, 2013 2:30 | 2081102 | 710 | 685 | 9 |
| Oct. 2, 2013 3:00 | 2081102 | 710 | 74845 | 9 |
| Oct. 2, 2013 3:30 | 2081102 | 710 | 74845 | 9 |
| Oct. 2, 2013 4:00 | 2081102 | 710 | 651 | 9 |
| Oct. 2, 2013 4:30 | 2081102 | 710 | 651 | 9 |
| Oct. 2, 2013 5:00 | 2081102 | 710 | 5412 | 9 |
| Oct. 2, 2013 5:30 | 2081102 | 710 | 7851 | 9 |

3b3. Sessionize the Set Top Box viewing events: Sessionization involves sorting the events by PersonKey, DateTime, and then cutting a session if there is no activity for more than INACTIVITY_TIME hours. We tend to use INACTIVITY_TIME=4 hours as our sessionization time. Cutting the session means that the personkey's viewing is assumed to end, so we put a ceiling on the viewminutes for the preceding Station-Program in that cable subscriber's viewing events.

3b4. Delete Channel change events: Channel change events occur when viewers are navigating through different channels, or flipping channels, and are alighting on a given channel for less than CHANNEL_CHANGE_DURATION seconds. We find that most channel change events occur with a 5 second time or lower, but we have also found that we can use a channel-change threshold of CHANNEL_CHANGE_DURATION=30 seconds gives good results in practice.

3b4. After sessionizing, we then calculate the time in seconds viewed between subsequent programs. This is calculated by taking the difference in timestamp between subsequent program viewing events. We then output: (PersonKey, DateTime, Station Calnetters, Program Name, ViewSeconds); and example of this is shown in Table F.

TABLE F

PersonViewingHistory Table

| Person Key | Date Time | Station Callletters | Program Name | View Seconds |
|---|---|---|---|---|
| 13417536 | Mar. 28, 2012 12:00 | WTNZ | Judge Mathis | 3000 |
| 13327781 | Mar. 20, 2012 9:00 | DSNY | Morning | 1800 |
| 13361244 | Mar. 11, 2012 20:30 | 853 | NBA Basketball | 1800 |
| 13330603 | Mar. 31, 2012 20:00 | HBO | Never Let Me Go | 1800 |
| 13360182 | Mar. 24, 2012 20:00 | TCM | Movie | 180 |
| 13320837 | Mar. 25, 2012 22:00 | MSNB | Caught on Camera | 180 |
| 13360182 | Mar. 21, 2012 21:00 | A&E | Dog the Bounty Hunter | 3600 |
| 13289535 | Mar. 22, 2012 20:00 | SPK | Impact Wrestling | 1140 |
| 13394656 | Mar. 14, 2012 18:00 | USA | NCIS | 1560 |
| 13367017 | Mar. 14, 2012 3:00 | LMN | Ordinary Miracles | 300 |

3c. Calculate Station Program viewing percentages by cable subscriber: For each PersonKey, we sum all viewseconds for each Station Program, and then divide by the total viewseconds for that PersonKey. The output is a table personviewing_profile=(PersonKey, Station Callletters, Program Name, ViewSecondsPct). Table G shows an example of this output.

TABLE G

SetTopBox.PersonStationProgramValue Table

| Person Key | Station Callletters | Program Name | View Seconds Pct |
|---|---|---|---|
| 4 | AMC | The Green Mile | 0.128118552 |
| 10 | SYFY | The Twilight Zone | 0.204059109 |
| 28 | FNEW | FOX & Friends | 0.090909091 |
| 32 | HISI | The Revolution | 0.104868336 |
| 36 | TBS | The Big Bang Theory | 0.139690037 |
| 42 | NKJR | Yo Gabba Gabba! | 0.133822306 |
| 44 | HLN | Morning Express with Robin Meade | 0.117905882 |
| 57 | NGC | Earth: The Biography | 0.19161565 |
| 59 | GRN | A Haunting | 0.16832462 |
| 65 | DISC | A Haunting | 0.143390965 |

4. Given the set of Buyers B, anonymously match the Buyers against the cable subscriber population P. Let b=Intersection(B,P) be the set of persons who are both cable subscribers, and are buyers; we will call these product purchaser—subscribers or buyer-cable subscribers. Calculation of the match can be done by using one of several method described below:

4a. One method is to use a universal identifier that represents persons, where the same universal identifier is assigned to the product purchasers as well as the cable subscribers. An algorithmic method to accomplish this is a process (often a third party because it creates a layer of privacy, but does not have to be) takes name-address information and attaches an anonymous Identifier to person records, and then strips the personally identifiable information and sends it back. The same service is then used for both product purchasers, and cable subscribers. Thus we then have a set of product purchasers with a universal identifier, a set of cable subscribers with universal identifier, and then we can select out cable subscribers who are exact matches to product purchasers. Companies including Acxiom and Experian currently offer an anonymization and universalID tagging service that works as above.

4b. There may be other processes which estimate that cable subscribers are similar to the product purchasers, for example demographics could be used to find cable subscribers who are similar to the product purchasers based on demographics, and these could be regarded as the "pseudo-buyer-cable-subscribers" for the purposes of the present algorithm.

6. For all persons who are buyer-cable-subscribers b, calculate an overall ViewSecondsPct for each Station Program for this group of people. This can be done by summing all Station, Program, viewseconds for persons and then dividing by total viewseconds for the group. The output is a table that we can call buyer_profile=(Station, Program, ViewSecondsPct). An example of this table is shown in table H.

TABLE H

SetTopBox.StationProgramValue Table. This table holds the "buyer profile" of programs that buyers tend to watch and the percentage of time viewing each program.

| Station Callletters | Program Name | View Seconds Pct |
|---|---|---|
| AMC | The Man From Snowy River | 0.005071 |
| DISC | Jack the Ripper in America | 0.009774 |
| DISC | Brazil Butt Lift | 0.003043 |
| GOLF | Best of Morning Drive | 0.009656 |
| DISC | Track Me if You Can | 0.010092 |
| BLOM | Countdown With Owen Thomas and Linzie Janis | 0.001463 |
| AMC | The Hills Have Eyes | 0.00243 |
| WNBC | NFL Football Preseason | 0.024068 |
| AMC | Support Your Local Gunfighter | 0.013499 |
| AMC | Halloween III: Season of the Witch | 0.009682 |

7. For all persons in the cable subscriber population who are not buyers, i.e. Candidate=P−B, measure the similarity between their view percentage vector (Table G) and the buyer view percentage vector (Table H). This can be calculated in several ways, but one method is below where $\bar{P}^+$ represents the view vector for buyer-cable subscriber, and $\bar{M}_i^+$ the view vector for the non-buyer cable subscribers.

$$r_E(\bar{P}, \bar{M}_i) = \frac{\bar{P}^+ \cdot \bar{M}_i^+}{|\bar{P}^+| \cdot |\bar{M}_i^+|} \quad \text{[Equation 81]}$$

This produces a table like that shown in Table I. Table A also shows a 10 line snippet from the algorithm output table with more detail including some of the additional statistics that can be generated. For example, Table A can also show many programs matched between non-buyer cable subscriber and the buyer profile.

TABLE I

Excerpt from Person.TargetTRatio Table for illustration purposes. A more complete version can be found in Table A.

| Person Key | TRatio |
|---|---|
| 10174988 | 0.24898 |
| 10174989 | −0.12579 |
| 10174990 | −0.22265 |
| 10174991 | −0.4316 |
| 10174992 | −0.23603 |
| 10174993 | −0.35799 |
| 10174994 | 0.159995 |
| 10174995 | 0.167286 |
| 10174996 | −0.36491 |
| 10174997 | −0.44456 |

The highest tratio persons in the list above could be considered the best prospects for an addressable targeting campaign, in terms of their raw probability of being purchasers and other factors not taken into account. This raw targeting score can be combined with other information—such as the number of times that these individuals have received the advertising message previously (user-specific frequency), and the cost per thousand for reaching subsets of these customers (often the larger is the group of cable subscribers which is being actively targeted, the lower will be the cost per thousand price for those subscribers) when determining which cable subscribers or package of cable subscribers to target.

A key practical advantage of this particular algorithm is that it does not need to use third party demographics data in order to accomplish addressable targeting. This can reduce data and processing cost, speed up the time between receiving a request for targeting and being able to provide back a package of addressable candidates, and enables data to be secured within a smaller number of entities.

B. Individual Addressable Targeting Using Demographic Similarity ("Algorithm D" or "Addr")

We will now describe an addressable television algorithm that uses an alternative method to score cable subscribers. This algorithm uses demographics to calculate degree-of-match to the product purchasers. FIG. 3 shows this algorithm graphically.

Embodiments of the present disclosure may use demographics to calculate the match between target product purchasers and cable subscribers. As shown in FIGS. 3, 5 and 7, embodiments may obtain consumer demographic data (705), product purchaser data (710), and cable subscriber data (720). The demographic data may be used to enrich each of the historical buyers (715) and the cable subscribers (725), and may then be used to generate a target demographic profile. That demographic profile may then be matched to other cable subscribers (730) to find persons who have the closest demographics (735). The identified persons and may be reported as cable subscribers with the closest match to ideal as possible advertising targets (740), such as according to Equation 10, for example.

$$r_E(\overline{P}, \overline{M}_i) = \frac{\overline{P}^+ \cdot \overline{M}_i^+}{|\overline{P}^+| \cdot |\overline{M}_i^+|}$$ [Equation 9]

We will now provide a detailed walkthrough of this algorithm. Embodiments of the present disclosure may implement such an algorithm according to the following pseudo-code:

Pseudo-Code for Algorithm D:

The algorithm will take as inputs a Cable Subscriber Population-To-Be-Scored, and a Product Purchaser Target Definition. Both of these inputs are represented as "source keys" by the system (Table A2, A3 and Table B)—which is a unique identifier that is used assigned to particular populations of persons—or to the aggregated demographic results from those populations (it is technically possible to have a sourcekey that represents just the demographic vector without an underlying population—for example, it could be hand-specified. In such a case as this there is still a sourcekey representing the unique target and virtual population to which it represents).

The output from the algorithm will be each cable subscriber person in the Population-To-Be-Scored with a tratio which measures the match between their demographics and the target's demographics (Table A contains the raw algorithm output and Table B contains the "permanent storage." Interestingly Table B is both an output and an input—this contains the persons to be scored, and it also holds the tratio output after scoring).

We will define several tables that we will use for our algorithm:

The Person table assigns each anonymized person in the database a PersonKey. An example of this table is shown in Table A1.

Each person is linkable to either an advertiser or cable company's representation of a person, which we term a "customer" in our database schema. CustomerKey in our schema captures the native key used for the person—this is a foreign key which makes it possible to track any person processed by the system, back to the originating record that was provided to it.

UniversalID is another optional field which makes it possible to match the anonymous person in different contexts. For example, product purchasers and cable subscribers could both have UniversalIDs, and an exact match means that we have the same person.

TABLE A1

| | | Person | | | |
|---|---|---|---|---|---|
| Person Key | Name | City | State/ Province | Zip/ PostalCode | Univer- salID |
| 1 | 1 | Greeley | CO | 80634 | A |
| 2 | 25 | Cottontown | TN | 37048 | B |
| 3 | 32 | COLUMBIA | SC | 29209 | C |
| 4 | 411 | Pine Hill | NJ | 08021 | D |
| 5 | 51 | ALMIRA | WA | 99103 | E |
| 6 | 6333 | MONTICELLO | KY | 42633 | F |
| 7 | 74 | FALL CREEK | WI | 54742 | G |
| 8 | 82 | PHILADELPHIA | PA | 19111 | H |
| 9 | 91 | MILLEN | GA | 30442 | I |
| 10 | 10 | Beaumont | TX | 77706 | J |

Each person belongs to a sourcekey, which means a collection or population of a company's customers. The sourcekey is defined in the Source table and the definition of which source a person is mapped to is defined in the PersonSource table. Table A2 and A3 show sources and personsource.

TABLE A2

Source Table with a selection of example columns. The SourceType field shows that we can define sources for a number of purposes - for example, sources could be product purchaser populations (eg. "Customers"), a 1% sample of US Population ("1% Sample"), look-a-like populations ("STB Lookalike"), Response targets - populations inferred from direct response data using another process ("Response targets") and so on.

| Source Key | Source Description | Project Key | Source Company Name | Source Type | Create Date |
|---|---|---|---|---|---|
| 110572 | a | 10134 | a | Customer Subset | Mar. 25, 2015 10:08 AM |
| 110573 | b | 10134 | b | Customer Subset | Mar. 26, 2015 2:11 PM |
| 110574 | c | 10134 | c | Customers | Apr. 2, 2015 10:40 AM |
| 110575 | d | 10150 | d | Response Target | May 6, 2015 10:30 AM |
| 110576 | e | 10155 | e | Customers | May 6, 2015 11:25 AM |
| 110577 | f | 10155 | f | Customer Subset | May 8, 2015 10:15 AM |
| 110578 | g | 10155 | g | Customer Subset | May 8, 2015 10:18 AM |
| 110579 | h | 10155 | h | Customer Subset | May 8, 2015 10:23 AM |
| 110580 | i | 10155 | i | Customer Subset | May 8, 2015 10:25 AM |
| 110586 | j | 10134 | j | Response Target | Jun. 19, 2015 2:47 PM |

TABLE A2-continued

Source Table with a selection of example columns. The SourceType field shows that we can define sources for a number of purposes - for example, sources could be product purchaser populations (eg. "Customers"), a 1% sample of US Population ("1% Sample"), look-a-like populations ("STB Lookalike"), Response targets - populations inferred from direct response data using another process ("Response targets") and so on.

| Source Key | Source Description | Project Key | Source Company Name | Source Type | Create Date |
|---|---|---|---|---|---|
| 110587 | k | 10159 | k | Customers | Jul. 21, 2015 3:34 PM |
| 110588 | l | 10164 | l | 1% Sample | Jul. 23, 2015 1:42 PM |
| 110589 | m | 10164 | m | 1% Sample | Jul. 23, 2015 1:42 PM |
| 110590 | n | 10167 | n | Customers | Jul. 28, 2015 3:57 PM |
| 110591 | o | 10165 | o | Customers | Jul. 28, 2015 3:57 PM |
| 110496 | p | 10092 | p | STB Lookalike | Mar. 21, 2014 10:53 AM |
| 110497 | q | 10093 | q | STB Lookalike | Mar. 21, 2014 11:05 AM |
| 110087 | r | 110087 | r | 1% Sample | Jan. 1, 2010 12:00 AM |
| 110076 | s | 110076 | s | 1% Sample | Jan. 1, 2010 12:00 AM |

TABLE A3

Simplified example of PersonSource to illustrate the concept: Each person can belong to multiple sourcekeys. Table B shows another example of this table but with more columns.

| Source Key | Person Key |
|---|---|
| 400 | 1 |
| 400 | 3 |
| 400 | 5 |
| 400 | 6 |
| 400 | 7 |
| 400 | 8 |
| 400 | 9 |
| 400 | 10 |
| 400 | 11 |
| 400 | 12 |

Each person also has a mapping to a set of demographic attributes which may have been generated by an enrichment process with a third party company that specializes in demographics. The demographics attribute details are stored in two tables: Demographics and DemographicsValue. The Demographics table contains demographic attribute such as "age," "gender," "income," and so on. The DemographicsValue table stores the specific sub-values for that demographic, such as "age=18 to 20, age=21 . . . 24" and so on. Table A4 and A5 shows the demographics and demographics value tables.

TABLE A4

Demographics Table

| DemographicsID | Demographics Name |
|---|---|
| 23 | Allergy Related Interest |
| 24 | Arthritis, Mobility Interest |
| 25 | Health - Cholesterol Focus |
| 26 | Diabetic Interest |
| 27 | Health - Disabled Interest |
| 28 | Orthopedic Interest |
| 29 | Senior Needs Interest |
| 30 | PC Internet Connection Type |
| 31 | Single Parent |
| 32 | Veteran |
| 33 | Occupation - Professional |

TABLE A5

DemographicsValue

| Demographics Value ID | Demographics ID | Demographics Value Name |
|---|---|---|
| 91 | 30 | Cable Internet |
| 92 | 30 | DSL Internet |
| 93 | 30 | Dial-Up Internet |
| 96 | 33 | Occupation - Professional |
| 97 | 33 | Architect |
| 98 | 33 | Chemist |
| 99 | 33 | Curator |
| 100 | 33 | Engineer |
| 101 | 33 | Aerospace Engineer |
| 102 | 33 | Chemical Engineer |

The mapping between a PersonKey and DemographicsValueID are stored in the PersonDemographicsMap table. This table generally contains a record or row for a demographic variable-value trait, only when it is "present," meaning that this table only stores 1s in terms of demographics. 0s are not stored and are implicitly assumed to be 0, and so absence of a trait is inferred to mean that there is a 0 for that demographic. This improves storage significantly.

In the equations we have defined demographic variable values as variables such as x,d,v where x is the person, d is a demographic, and v is a value. The x,d,v variables are defined by the PersonDemographicsMap table.

Although we often refer to the combination of demographic with demographicvalue, Demographicsvalueid can be set up to function as the primary key and can uniquely describe the specific combination of demographic and demographicvalue.

TABLE A6

PersonDemographicsMap Table. This table only shows 0-1 demographic variable-value traits that are "present" (i.e. 1) for a given person.

| Person Key | Demographics ID | Demographics Value ID |
|---|---|---|
| 10174988 | 14 | 76 |
| 10174988 | 44 | 55953 |
| 10174988 | 47 | 539 |
| 10174988 | 58 | 55972 |
| 10174988 | 63 | 660 |
| 10174988 | 65 | 662 |
| 10174988 | 84 | 681 |
| 10174988 | 101 | 695 |

TABLE A6-continued

PersonDemographicsMap Table. This table only shows
0-1 demographic variable-value traits that are "present"
(i.e. 1) for a given person.

| Person Key | Demographics ID | Demographics Value ID |
|---|---|---|
| 10174988 | 116 | 712 |
| 10174988 | 134 | 764 |

Some examples of cable subscriber person demographic profiles for an example Personkey=19048092 are shown in table J, K, L, and A7 below.

TABLE J

Personkey = 19048092 has the above demographic traits relating
to "Marital status." Note that the z-score versions of
the traits are also shown. This is what is used for vector matching.
In the above table, "Demographics Source Desc" refers
to the demographic -demographicvalue value represented as a string
for human readability, "has demo" means that the person
has this demo (in this case "Marital Status") and "has
variable value" indicates that they have a particular variable-
value (in this case "Married"). The above table says that
x(MaritalStatus, Married) = 1.

| Demographics Source Desc | zscore | has variable value | has demo |
|---|---|---|---|
| Single | −15.03442585 | 0 | 1 |
| Inferred Single | −3.702081749 | 0 | 1 |
| Inferred Married | −2.015544526 | 0 | 1 |
| Married | 9.63324338 | 1 | 1 |

TABLE K

Personkey = 19048092 has the above demographic traits relating
to "Income - Narrow ranges." Note that the z-score versions
of the traits are also shown. This is what is used for vector
matching. In the above table, "Demographics Source Desc"
refers to the demographic -demographicvalue value represented
as a string for human readability, "has demo" means
that the person has this demo (in this case "Income Narrow
Ranges") and "has variable value" indicates that
they have a particular variable-value (in this case "$125,000-
$149,999"). The above table says that x(IncomeNarrowRanges,
$125,000-$149,000) = 1.

| Demographics Source Desc | zscore | has variable value | has demo |
|---|---|---|---|
| Less than $15,000 | −1.732861144 | 0 | 1 |
| $15,000-$19,999 | −2.05088993 | 0 | 1 |
| $20,000-$29,999 | −3.127608118 | 0 | 1 |
| $30,000-$39,999 | −7.338503177 | 0 | 1 |
| $50,000-$59,999 | −14.19369231 | 0 | 1 |
| $70,000-$79,999 | −7.407445639 | 0 | 1 |
| $80,000-$89,999 | −3.478227705 | 0 | 1 |
| $90,000-$99,999 | −0.755536358 | 0 | 1 |
| $100,000-$124,999 | −2.835779486 | 0 | 1 |
| $125,000-$149,999 | 21.66825797 | 1 | 1 |
| Greater than $149,999 | −1.949531257 | 0 | 1 |

TABLE L

Personkey = 19048092 has the following top and bottom demographic
traits. The above demographics are a special kind of demographic
called an "indicator" demographic - these only have a value
of 1 or if missing are inferred to be 0. Thus all of these are
equivalent to saving "Demographic = true". The above
table shows top negative traits also - these indicate that it is
more unusual to not have these traits compared to the US Population -
for example, it is unusual to not be interested in SpectatorSports -
Football, and so the z-score for this demographic trait (which
is a 0 for this customer) is more negative than the others.

| Demographic name | Zscore | has variable value | has demo |
|---|---|---|---|
| Exercise-Aerobic | 79.92347757 | 1 | 1 |
| Career | 70.03063336 | 1 | 1 |
| High-TechLiving | 68.84047148 | 1 | 1 |
| Fishing | 68.64658538 | 1 | 1 |
| Boating/Sailing | 68.55685224 | 1 | 1 |
| Travel-International | 64.76999726 | 1 | 1 |
| Photography | 62.71386773 | 1 | 1 |
| Travel-C | 62.22263895 | 1 | 1 |
| AutoWork | −1.448205109 | 0 | 0 |
| HomeFurnishings/Decorating | −1.449296904 | 0 | 0 |
| HomeLiving | −1.478087135 | 0 | 0 |
| Homeimprovement | −1.513269184 | 0 | 0 |
| BroaderLiving | −1.525012494 | 0 | 0 |
| Dieting/WeightLoss | −1.543605543 | 0 | 0 |
| Camping/Hiking | −1.602009909 | 0 | 0 |
| SpectatorSports-Football | −1.783328723 | 0 | 0 |

Each cable subscriber person X may have a set of demographics x={0,1} that may be set to 0 or 1. Rather than storing 0 demographics, the database schema can be set up to only show demographics that are "present" or 1. That will decrease the amount of storage in the demographic table. Let that demographic vector be X where $x_{d,v}=\{0,1\}$. Table A7 shows an example of person demographic, demographic values, along with a z-score to represent the "unusualness" of this value compared to the US population.

TABLE A7

PersonVariableValueProfile

| Person Key | Demographics ID | Demographics Value ID | ZScore |
|---|---|---|---|
| 10174988 | 93 | 56025 | 0.683761948 |
| 10174988 | 93 | 56026 | 0.968439159 |
| 10174988 | 93 | 56027 | 0.204178975 |
| 10174988 | 93 | 56028 | 0.80541485 |
| 10174988 | 93 | 56029 | −0.208246564 |
| 10174988 | 93 | 56030 | 0.62596653 |
| 10174988 | 93 | 56031 | −0.038819315 |
| 10174988 | 93 | 56032 | 0.11029697 |
| 10174988 | 94 | 56033 | 0.013483197 |
| 10174988 | 94 | 56034 | 0.267608507 |

Each advertiser target Y may be an "idealized" demographic vector which may define the demographic vector that they are trying to obtain. The advertiser target itself is defined as a "sourcekey" and itself may have a population of persons that collectively together define the target. These persons are product purchasers who have bought the advertiser's product before.

Let the demographic vector for the product purchasers be Y where $y_{d,v}=(0,1)$; ie. each $y_{d,v}$ is a probability. The probabilities for this vector may be calculated by taking the total persons with the demographic trait divided by the total persons, or alternatively, the probabilities may be hand-entered or picked up from a different system.

The overall zscore demographic profile for the target product purchasers is stored in the VariableValueProfile table (Table A8). Table L shows the table in more detail, including details on the number of persons behind each statistic.

TABLE A8

SourceVariableValueProfile

| Source Key | Demographics ID | Demographics Value ID | ZScore |
|---|---|---|---|
| 10021 | 93 | 56025 | 0.683761948 |
| 10021 | 93 | 56026 | 0.968439159 |
| 10021 | 93 | 56027 | 0.204178975 |
| 10021 | 93 | 56028 | 0.80541485 |
| 10021 | 93 | 56029 | −0.208246564 |
| 10021 | 93 | 56030 | 0.62596653 |
| 10021 | 93 | 56031 | −0.038819315 |
| 10021 | 93 | 56032 | 0.11029697 |
| 10021 | 94 | 56033 | 0.013483197 |
| 10021 | 94 | 56034 | 0.267608507 |

TABLE L1 columns 1-6: Centroid customers with variable refers to the number of persons in US Population who have the demographic. Centroid customers with variable value refers to the number of persons in US population who have the variable-value. Using these we create a Centroid variable value pct of variable (Table L1 columns 7-14). The table also contains source variable value pct of variable - this is the corresponding percent of the time that this demographic variable-value is 1 in the population. The source and centroid versions of this variable can be compared to create a z-score which measures the unusualness of the demographic trait compared to its reference or "centroid" population (usually the US population).

| Source segment key | Demographics id | Demographics value id | ZScore | Centroid customers with variable | Centroid customers with variable value |
|---|---|---|---|---|---|
| 10021 | 93 | 56027 | 0.204178975 | 113362 | 6345 |
| 10021 | 93 | 56028 | 0.80541485 | 113362 | 3863 |
| 10021 | 93 | 56029 | −0.208246564 | 113362 | 2781 |
| 10021 | 93 | 56030 | 0.62596653 | 113362 | 1994 |
| 10021 | 93 | 56031 | −0.038819315 | 113362 | 1485 |
| 10021 | 93 | 56032 | 0.11029697 | 113362 | 1146 |
| 10021 | 94 | 56033 | 0.013483197 | 264568 | 107531 |
| 10021 | 94 | 56034 | 0.267608507 | 264568 | 25598 |
| 10021 | 94 | 56035 | 0.416721507 | 264568 | 47226 |
| 10021 | 94 | 56036 | 0.655798863 | 264568 | 26630 |
| 10021 | 94 | 56037 | 0.037821005 | 264568 | 17957 |

TABLE L1 columns 7-14

| Centroid variable value pct of variable | Source customers with variable | Source customers with variable value | Source variable value pct of variable | Number of unique values for variable | allrecs | Source num sources | Source numpersons |
|---|---|---|---|---|---|---|---|
| 0.055971137 | 108 | 8 | 0.074074074 | 10 | 895779 | 183 | 3802 |
| 0.034076675 | 108 | 5 | 0.046296296 | 10 | 895779 | 183 | 3802 |
| 0.02453203 | 108 | 2 | 0.018518519 | 10 | 895779 | 183 | 3802 |
| 0.017589668 | 108 | 4 | 0.037037037 | 10 | 895779 | 183 | 3802 |
| 0.013099628 | 108 | 2 | 0.018518519 | 10 | 895779 | 183 | 3802 |
| 0.010109208 | 108 | 1 | 0.009259259 | 10 | 895779 | 183 | 3802 |
| 0.406439932 | 271 | 84 | 0.3099631 | 10 | 895779 | 183 | 3802 |
| 0.096753954 | 271 | 45 | 0.166051661 | 10 | 895779 | 183 | 3802 |
| 0.178502313 | 271 | 45 | 0.166051661 | 10 | 895779 | 183 | 3802 |
| 0.100654652 | 271 | 30 | 0.110701107 | 10 | 895779 | 183 | 3802 |
| 0.06787291 | 271 | 20 | 0.073800738 | 10 | 895779 | 183 | 3802 |

Let CentroidMean (written as CentroidVariableValuePctOfVariable in Table L1) be the average rate of occurrence of a demographic trait in a reference population such as the US population. It may be calculated by summing all persons with the trait divided by all persons using the population sample. Let CentroidStandardDeviation be the average divergence in each demographic within the reference population. This may be calculated by bootstrap sampling the reference population.

1. Assemble the person demographics X into a vector of 0 and 1. If the 0s aren't stored for each person, then these can be generated by outer joining with the list of all available demographics and setting missing demographics in the person's profile to 0.

2. Assemble the target demographics into a vector of probabilities Y.

3. Scale each vector element by a rarity formula. Below are two examples. Log Lifts can be calculated as shown in equations 82 and 83:

$$X'=\log(X/\text{CentroidMean1}) \quad \text{[Equation 82]}$$

$$Y'=\log(Y/\text{CentroidMean2}) \quad \text{[Equation 83]}$$

Z-Scores can be generated as shown in equations 83 and 84:

$$X'=(X-\text{CentroidMean1})/\text{CentroidStdev1} \quad \text{[Equation 83]}$$

$$Y'=(Y-\text{CentroidMean2})/\text{CentroidStdev2} \quad \text{[Equation 84]}$$

The CentroidMean and CentroidStdev for reference populations need not be the same for cable subscribers (X) and buyer-cable subscribers (Y). In some cases the particular population that these persons come from is very different and each needs to use a specific reference population to normalize each.

4. Define a weight for each vector element by a demographic variable-value weight. This weight can be calculated as the inverse of the number of demographic-variable-values that are present for any demographic. Or it can be entered based on another analysis of which demographics traits carry the most weight.

TABLE M

DemographicsWeight. The weights above can be developed separately based on an analysis of how well each contributes to prediction. A simple weighting scheme may also be to set each weight to (1/number of demographic values).

| Demographic Variable | Weight |
| --- | --- |
| Pets | 1 |
| New Vehicled | 0.5 |
| Used Vehicle | 0.5 |
| New Parent - Child Less than 6 Months | 0.333333333 |
| New Parent - Child 7-9 Months | 0.333333333 |
| New Parent - Child 10-12 Months | 0.333333333 |
| Expectant Parent | 0.5 |
| Intends to Purchase a Vehicle | 0.333333333 |

5. Calculate the vector match between the individual vector and the target vector, using one of several methods.

Correlation: The degree-of-match could be calculated using a weighted correlation calculation shown in Equation 85 and 86.

$$E[x] = \sum_i w_i x_i; \; E[y] = \sum_i w_i y_i \quad \text{[Equation 85]}$$

$$r_\Omega(X, Y) = \frac{\sum_i w_i(x_i - E[x])(y_i - E[y])}{\sqrt{\sum_i w_i(x_i - E[x])^2(y_i - E[y])^2}} \quad \text{[Equation 86]}$$

Inverse Euclidean Distance: Variants of Euclidean distance can also be used to measure the vector similarity. This is shown in Equation 87.

$$r_\Omega(X,Y)(\Sigma_i w_i(x_i-y_i)^2)^{-1/2} \quad \text{[Equation 87]}$$

An example SQL PROC call to execute this procedure is as follows:

exec Person.Scoring <PopulationToScore>,<TargetDefinition> where <PopulationToScore> is a sourcekey and <TargetDefinition> is also a sourcekey. An example of the above call is below:

exec Baker.Acxiom.Person.Scoring '110424','110402'

In the above example, 110424 is a population of insurance customers. They are each scored against target 110402-NC-1 (natural cluster 1).

An example SQL Query to view results is shown below:

select top 10*from Person.SourceTargetTratio where sourcesegmentkey='110424' and sourcesegmentkeytarget='110402-NC--1'

An example output from the algorithm is shown in Table A and Table N.

TABLE N

Excerpt from Addressable algorithm output showing the columns generated for illustrative purposes. Another example output with more columns is shown in Table A.

| Source Segment Key Target | Person Key | Source Segment Key | TRatio |
| --- | --- | --- | --- |
| 110402-NC-1 | 10532089 | 110424 | 0.139791 |
| 110402-NC-1 | 10532146 | 110424 | 0.0143 |
| 110402-NC-1 | 10532158 | 110424 | 0.012744 |
| 110402-NC--1 | 10532187 | 110424 | 0.202012 |
| 110402-NC--1 | 10532395 | 110424 | 0.194542 |
| 110402-NC--1 | 10532513 | 110424 | −0.36149 |
| 110402-NC--1 | 10532573 | 110424 | 0.154197 |
| 110402-NC--1 | 10532580 | 110424 | 0.138061 |
| 110402-NC--1 | 10532674 | 110424 | 0.076452 |
| 110402-NC--1 | 10532713 | 110424 | −0.00053 |

The system described above has good scaling characteristics, and so may be deployed on the higher data volumes available with set top boxes and demographics. Given S=20 million set top boxes, M=60 million cable subscribers, D=3,000 demographics per person, and C=1 buyer profile targets, the training time for calculating matches can be calculated in M*S*D+C*S*D+C*M*D time, which is linear in M, set top boxes, and demographics, so may be highly efficient.

The algorithm can also be implemented in a way that avoids transmission of personal information between companies—which is useful for privacy reasons. The above algorithm could be implemented by having product purchaser information and cable subscriber information copied to a location, and then aggregates the purchaser information and calculate match to cable subscribers. However a technique that avoids transmitting the product purchaser data and cable subscriber "over the wire" is to aggregate product purchasers into an anonymous aggregated demographic vector. This can be executed by the advertiser—for example—or the entity which has the primary relationship with the product purchasers. The anonymous, aggregated, vector—without the persons—can then be passed to the ad targeting entity—which may be a cable operator who has a direct relationship with the cable subscribers. The match to each cable person can then be calculated. Therefore cable subscriber information is not disseminated outside of the cable company, nor is product purchaser information disseminated outside of the advertiser.

The invention can also provide detailed information on "why" particular cable subscribers—or packages of subscribers—are scoring highly, or in what respects these persons are a match for the advertiser. The reason why a cable subscriber—or a package of cable subscribers—received a high score, can be shown by calculating the covariance of each demographic d,v between product purchasers and cable subscriber or group of cable subscribers (250):

$$Cov = (\overline{P}_{d,v}^+ \cdot \overline{M}_{i,d,v}^+) \quad \text{[Equation 10]}$$

The co-variances for each demographic can then be sorted from highest to lowest (255). This will show the demographics d,v with the highest covariance between the buying population $\overline{P}$ and media viewing population $\overline{M}_i$. This may provide insight into what is driving the match, and may help media buyers understand why the media matches their target as shown in FIG. 4. shows an example comparison between product purchaser demographic and cable subscriber demographics, revealing that the cable subscriber population is a good match is because the advertiser is looking for low income, retired, 65+ people, and the cable subscriber matches these criteria.

In FIG. 4, the wider bars refer to the standardized demographic score for the program. The narrower bars are the standardized demographic reading for the advertiser's target.

V. Addressable Algorithm Output

The output from the addressable algorithms (C or D) is a set of personkeys with tratio. Table A shows an example of this output.

Table A shows an example of the output generated from a call such as "exec Person.Scoring '110424','110402'". The column named SourceSegmentKey is the population of persons that we scored (110424), SourceSegmentKeyTarget (110402) is an identifier for the population of product purchasers who were the target that we scored against, PersonKey is a unique key representing a cable subscriber, VariableValueCounts are the number of demographics that this person had which were non-zero and which matched the corresponding demographic in the SourceSegmentKeyTarget demographic profile, tratio is the calculated correlation coefficient—we weight demographic vector elements differently and so this is a weighted correlation, tratioUnweighted is correlation coefficient unweighted, tratiounweightedpositive is the correlation coefficient only using demographics that were present (this is computationally much more efficient, e.g. if there are on average 300 present demographics and 3000 total possible, then this would drop the operations by 10× or more, however it is also inaccurate), Unweighted distance is the Euclidean distance between the cable subscriber vector and the product purchaser vector, Dist is the Euclidean distance with weights on particular demographics, and ClusterID is the cluster to which the personkey belongs. A Cluster is a segment or grouping. In this case it was generated using a K-means process. The cluster results can be seen in FIG. 10 where the lift for different clusters is reported.

TABLE A columns 1-7

| Source Segment Key Target | Person Key | Source Segment Key | Variable Value Counts | TRatio | TRatio Un Weighted | TRatio Unweighted Positive |
|---|---|---|---|---|---|---|
| 110402 | 19298389 | 110424 | 220 | 0.385928 | 0.204713 | 0.127249 |
| 110402 | 30868985 | 110424 | 199 | 0.365495 | 0.245077 | 0.157574 |
| 110402 | 19174232 | 110424 | 233 | 0.364809 | 0.21583 | 0.147793 |
| 110402 | 19531659 | 110424 | 233 | 0.364197 | 0.240444 | 0.173181 |
| 110402 | 19532235 | 110424 | 226 | 0.360298 | 0.184925 | 0.183636 |
| 110402 | 19054857 | 110424 | 213 | 0.360219 | 0.230345 | 0.188773 |
| 110402 | 19174076 | 110424 | 217 | 0.359639 | 0.212313 | 0.133903 |
| 110402 | 32219451 | 110424 | 196 | 0.358918 | 0.212269 | 0.212729 |
| 110402 | 19085053 | 110424 | 224 | 0.35824 | 0.192599 | 0.184416 |

TABLE A columns 8-14: Addressable Algorithm Output.

| TRatio Positive | Corr Unweighted Prob | Corr Prob | Un Weighted Dist | Dist | Dist Prob | Cluster ID |
|---|---|---|---|---|---|---|
| 0.226913 | 0.626077 | 0.684781 | 556.318 | 937.3734 | 0.230774 | 2 |
| 0.233954 | 0.623585 | 0.671212 | 596.4309 | 916.2229 | 0.231763 | 1 |
| 0.207034 | 0.641075 | 0.73472 | 442.2053 | 674.0267 | 0.17402 | 3 |
| 0.277324 | 0.686021 | 0.727547 | 428.6808 | 679.9121 | 0.181987 | 3 |
| 0.29449 | 0.639897 | 0.702935 | 571.5545 | 920.0677 | 0.219922 | 3 |
| 0.287615 | 0.644281 | 0.675603 | 401.6007 | 598.5678 | 0.167337 | 3 |
| 0.217374 | 0.62326 | 0.688755 | 548.1325 | 769.8527 | 0.199459 | 2 |

TABLE A-continued columns 8-14: Addressable Algorithm Output.

| TRatio Positive | Corr Unweighted Prob | Corr Prob | Un Weighted Dist | Dist | Dist Prob | Cluster ID |
|---|---|---|---|---|---|---|
| 0.313002 | 0.740417 | 0.750409 | 539.3746 | 789.5785 | 0.182453 | 2 |
| 0.286724 | 0.62383 | 0.675448 | 424.8026 | 692.2451 | 0.18176 | 3 |

TABLE B columns 1-8

| Source Key | Person Key | Create Date | Ranking Segment Value | Rating | Ranking Segment | Source Segment 3 | Source Segment 4 |
|---|---|---|---|---|---|---|---|
| 110402 | 19035090 | Dec. 5, 2012 10:04 PM | | | | 32 | Direct Bill |
| 110402 | 19035102 | Dec. 5, 2012 10:04 PM | | | | 20 | ABW |
| 110402 | 19035112 | Dec. 5, 2012 10:04 PM | | | | 17 | Direct Bill |
| 110402 | 19035154 | Dec. 5, 2012 10:04 PM | | | | 45 | Direct Bill |
| 110402 | 19035285 | Dec. 5, 2012 10:04 PM | | | | 10 | Direct Bill |
| 110402 | 19035313 | Dec. 5, 2012 10:04 PM | | | | 26 | ABW |
| 110402 | 19035364 | Dec. 5, 2012 10:04 PM | | | | 21 | ABW |
| 110402 | 19035417 | Dec. 5, 2012 10:04 PM | | | | 37 | ABW |
| 110402 | 19035419 | Dec. 5, 2012 10:04 PM | | | | 29 | ABW |
| 110402 | 19035420 | Dec. 5, 2012 10:04 PM | | | | 32 | Direct Bill |

TABLE B columns 9-17: PersonSource table. This table contains a list of persons who are part of a population in this case keyed by 110402. Persons have a unique PersonKey. Each person carries advertiser-assigned value and segment information - for example, PersonKey = 19035090 has an advertiser-provided revenue of 562, and belongs to a segment called "Direct Bill." The column tratio has the individual person tratio as calculated by the addressable algorithm. The above data can be used to measure the addressable algorithm's lift.

| Source Segment5 | Source Segment6 | Cluster ID | Value1 | Acquisition Date | ChurnDate | Customer ID | TRatio | Variable Value Counts |
|---|---|---|---|---|---|---|---|---|
| 1 | 0 | 2 | 567.42 | NULL | NULL | A | 0.496536 | 21 |
| 1 | 0 | 1 | 1113.08 | NULL | NULL | B | 0.300848 | 33 |
| 1 | 1 | 2 | 556.24 | NULL | NULL | C | 0.247989 | 70 |
| 0 | 0 | 3 | 1664.86 | NULL | NULL | D | 0.369883 | 93 |
| 0 | 0 | 3 | 844.34 | NULL | NULL | E | 0.67686 | 11 |
| 1 | 0 | 2 | 914.97 | NULL | NULL | F | 0.249641 | 52 |
| 1 | 0 | 3 | 1689.21 | NULL | NULL | G | 0.385853 | 24 |
| 1 | 0 | 3 | 1137.11 | NULL | NULL | H | 0.088981 | 83 |
| 1 | 1 | 2 | 2062.05 | NULL | NULL | I | 0.42078 | 25 |
| 0 | 0 | 3 | 1732.96 | NULL | NULL | J | 0.235426 | 45 |

VI. Lift Measurement of Addressable Targeting Using a Known Advertiser Population We next describe a process where the lift from the addressable television algorithm is estimated. The process below refers to an exemplary television advertiser, e.g., advertiser 110402, who had run over 20,000 airings and was selling a life insurance product was used. The exemplary television advertiser set aside 50,000 known buyers in their population that were used as a target population. Following Algorithm D, the target population of product purchasers were enriched with demographics and used to generate a target profile. The target demographic profile is shown in FIG. 8. The customers tended to be 60+, retired, low income, rural, and likely to own a compact car.

In FIG. 8, variables are indexed compared to U.S. population, so for example, 2.0 means that twice as many persons who have bought the advertiser's product have this trait than what would be expected if a random sample of persons were collected from the U.S. population.

The advertiser also had another 800,000 different customers who had also held policies with their company. These customers would be treated like make-believe "cable subscribers" so as to be able to generate lift measurements. This population carries with it value information assigned by the advertiser. The value information can be a unique performance measure for the advertiser, and in this example we have used revenue and how long they had held policies—so we could see how valuable each of these persons is to the advertiser in reality. Next this population was scored using Algorithm D. After scoring each person had an associated tratio.

Each of these persons included a known advertiser-assigned-value including revenue accrued from their policies ("revenue"), and number of months they had retained their life insurance policy ("months in force").

FIGS. 9 and 10 show the population ordered by target score (tratio), and their expected policy durations and revenue.

As shown in FIG. 9, as targeting score increases, so does the expected revenue. Also shown in the diagram are three natural clusters (NC1,NC2,NC3) inferred using the k-means algorithm on the demographic data from each person. These are sub-populations: NC1 tend to be older males, NC3 older females, and NC2 tend to be younger persons. NC2 is not as good a target as the others and is less valuable, and this is clearly shown in FIGS. 9 and 10 as it is shifted lower than the other two. As the clusters increase their targeting score, the persons being targeted each become more valuable. This relationship holds across clusters and overall population.

As shown in FIG. 10, as targeting score increases, the probability of holding policies for longer periods of time increases. This report shows that people who were closer to the demographic profile for buyers tended to have longer retention on policies and higher revenue.

Lift could then be calculated as the customer value (e.g. months in force or revenue in this example) divided by the average customer value in the population.

Another calculation method is to calculate lift as the customer value divided by the average customer value from a subset of customers who are considered to be representative of the customers who are found in the US Population. This would provide an estimate of the lift from addressable targeting compared to random ads on television.

VII. Lift Measurement of Addressable Targeting Algorithms Compared to Spot Television Algorithms It is also possible to measure the lift between buying Addressable Television media (scored by Algorithm C or D), versus buying Conventional television media (scored by algorithm A, B or other spot algorithms that produce a score for spot media).

This comparison can help to identify the relative value of addressable television ads compared to traditional spot television ads as well as the relative performance of different algorithms. For example, national television media might have an average CPM of $6. Using the technique described next, we may find that the average lift (for the top 1% of traditional spot inventory that is available to purchase) might be 2.0. We might next calculate that addressable targeting can confer a lift of 10.0 (for a package of the top 1% of cable subscribers as scored by the addressable Algorithm D). In this case we would be able to note that addressable targeting has 5 times the lift of a conventional television spot buy. If the advertiser is able to—or had been buying—the conventional spot at $6 and found that their television buy was profitable, they should also be able to buy the addressable inventory at a CPM of $30 and be profitable.

This technique of (a) estimating lift due to addressable television inventory, (b) estimating lift due to conventional television spots, (c) calculating the ratio of the two lifts, and (d) using the ratio to help set a CPM that appropriately values the improved lift due to addressable, is extremely useful both for (i) advertisers, who want to calculate whether or not addressable media at a given CPM will be cost effective for them to buy, and also (ii) cable and satellite companies who are selling addressable media, as they want to be able to rationally set prices for their addressable inventory. Pricing is currently a major problem with addressable inventory and we will describe this application in more detail next:

In order to measure advertiser lift, we need a measure of the value of the media that is relevant to the advertiser, and which is as universal as possible—ie. that could be applicable to—and calculable for—any of the many advertisers who buy television media. We define our universal measure of value as based on the number of buyers per total audience who are in the media asset being purchased.

The above definition can be calculated for both convention television spots as well as addressable inventory: (1) For addressable inventory, Buyers are cable subscribers who are known to have purchased the advertiser's product before, and the quality of targeting is the cable subscribers who are buyers divided by total subscribers who have been targeted.

(2) For conventional television spots, the quality of targeting may be measured by buyers in the audience of program divided by total viewers watching the program.

"Buyers," in both cases, are identified by matching advertiser known purchasers to cable subscriber/viewers. One algorithmic method of matching is to use a third party company takes name-address information and attaches an anonymous Identifier to person records, and then strips the personally identifiable information and sends it back. The same service is then used for both product purchasers, and cable subscribers. Thus we then have a set of product purchasers with a universal identifier, a set of cable subscribers with universal identifier, and then we can select out cable subscribers who are exact matches to product purchasers. Companies including Acxiom and Experian currently offer this anonymization and universalID tagging service.

Buyers per impression therefore can be used to measure the value of either addressable packages, or conventional media audiences. A major benefit of this calculation is that it is not impacted by a variety of factors that can obscure estimates of quality of targeting. For example, often advertisers run very long television campaigns (e.g. companies such as Kraft might have been advertising for 10 years), and this can result in "media fatigue" where the performance of television declines over time due to repeated re-exposure. Another example is the particular television commercial creative used, may induce it to be more effective or less effective—for example, Creative A may be more intrinsically effective than Creative B. If there are more Creative As being run on particular networks, then the estimate of quality of targeting on those networks would be artificially high. Buyers per impression or Buyers per million is a universal measure for how well the ad is reaching the high probability buyers—i.e., how well the ad is being targeted, and is not affected by these specific factors about the ad (these factors are of interest when measuring the total effectiveness of an advertising campaign, but even if the objective is to measure total effectiveness, it is useful to be able to independently measure the quality of targeting without other factors interfering with it).

Buyers per million is affected by the propensity of the population to buy the product in question, and as a result if it is un-normalized, this metric is directly comparable for advertisers in the same industry selling similar products. In order to compare across industries, the metric has to either be normalized by rate of purchase, or alternatively, an equivalent number of seed purchaser-cable subscribers should be selected, so that the average Pr(Buyer) is equivalent between products. The lookalike method described later can be used to generate that equivalently-sized pool of pseudo-product-purchaser persons, resulting in a buyer per million metric that is comparable across industries and products (specifically we set the purchaser-cable subscriber number to the same number for different advertisers, and then use lookalikes to add persons, or remove persons with the lowest ratios until we reach the set number of persons.

For conventional television ad spots, cable and broadcast media may be represented as network-day-hours during one week. There are approximately 35,000 buyable Networks-Day-Hours, and an example of this media definition could be CNN-Tues-8 pm. For Addressable television inventory, the inventory may be represented as cable subscribers, and so the cardinality is equal to the cable subscriber universe; for example, a small cable operator might have a universe of 4 million cable subscribers who could each potentially be targeted, or a large one like Comcast might have 60 million subscribers. An example of an addressable asset in this case is Cable Subscriber (Person)=1234.

Thus, there are 35,000 spot placements, which may be scored using conventional algorithms (M32, TRP; Algorithms B, A). There is also a cable population where each individual person may be scored using Addressable Algorithm D or C, and for example, DirecTV may have 20 million subscribers who can be scored.

Each algorithm will score its media. We can now perform a variety of analyses to measure lift.

In one example, we may rank the media in order of the algorithm score (e.g. tratio), and examine the media that has been ranked, and measure the actual buyers per million in that media. This enables us to calculate lift for each algorithm as the buyers per million divided by population average buyers per million. FIG. 11, 12, 13 show example analyses. FIG. 11 is a Cumulative Buyers isolated given percentile of cases. FIG. 12 shows the expected buyers per million at different tratio levels, given that tratio has been broken into percentiles. FIG. 13 shows lift compared to random targeting versus percentile of population—when sorted into order by tratio largest to smallest. Using these analyses it is possible to compare different algorithms against their ability to find high buyer per million assets.

Addressable Inventory Price Calculation Using BPM Lift Measurement

Given two packages of media, $\{M_R^+\}$ and $\{M_A^+\}$, where the first is randomly assembled, and the second is selected by Algorithm A, we can calculate lift as follows by comparing the ratio of their Buyer per million counts:

$$\text{Lift}(\{M_A^+\}, \{M_R^+\}) = \frac{BPM(\{M_A^+\})}{BPM(\{M_R^+\})} \quad \text{[Equation 88]}$$

Let us now suppose that we have two Targeting Algorithms: A—which operates on traditional television spot inventory—and D—which is an addressable algorithm and operates on addressable inventory. We can calculate each of their lifts using Equation 88.

The ratio of Equation 88 calculated for Algorithm A and Algorithm D is the RelativeLlift between Algorithm A and D.

$$\text{RelativeLift}(\{M_D^+\}, \{M_A^+\}) = \frac{\text{Lift}(\{M_D^+\}, \{M_R^+\})}{\text{Lift}(\{M_A^+\}, \{M_R^+\})} \quad \text{[Equation 89]}$$

Let us also say that we have a price for traditional television spot media CPM($\{M_A^+\}$) that is accepted as a reasonable "rate card price" for media.

A price for Addressable media can now be calculated as follows:

$$\text{CPM}(\{M_D^+\}) = \text{CPM}(\{M_A^+\}) * \text{RelativeLift}(\{M_D^+\}, \{M_A^+\}) \quad \text{[Equation 90]}$$

This price appropriately increases the CPM price based on the relative richness of buyers per million that are able to be isolated with Algorithm D versus Algorithm A.

Setting prices on addressable inventory by algorithms including (a) calculating the price based on a function of the buyers per million in the media, and/or (b) using a known rate-card price on traditional media and then scaling to an addressable price based on knowledge of the relative richness of buyers; provides for a method of improved price setting on addressable media. For example, if CPM($\{M_A^+\}$) is known to be profitable or cost effective for an advertiser, then Equation 90 will help to set the price of addressable media such that it is also profitable or cost effective for the same advertiser. This can help to ensure that prices on Addressable media packages are rational. A property of this pricing algorithm is that smaller audiences being targeted, would attract prices that are higher since the lift from those audiences is higher.

The above calculations can be modified in several ways. When calculating the number of Buyers, often direct matches between the advertiser's historical customers and cable subscribers is very low. For example, and advertiser might only have 2,000 product purchasers. When this happens, there might be only 1 purchaser-cable subscriber detected, or perhaps none at all. In addition, even if there are some matches, the resulting profile might be dominated by the peculiarities of that tiny number of matching people, and some of the demographics may be spurious due to the low number of people in the same (for example, perhaps there is a diabetes person in the group—that could push the rate of diabetes unusually high and cause matches to drive off that variable). As a result, lookalike matches may be performed to increase the number of persons who are used as the "seed population" for building the target profile, and thereby increase the robustness of the vector being used for matching. "Lookalike matching" works by taking the set of known product purchasers, enriching them with demographics. The algorithm then finds non-purchaser cable subscribers who have the most similar demographics to the purchasers. The number of look-a-likes can be defined by a fixed number (e.g. 10,000 total purchaser-cable subscribers plus lookalikes) or another criteria (e.g. find look-a-likes with scores better than x). The look-a-like cable subscribers plus purchaser-cable subscribers (if any) are then used as the set of purchaser-cable subscribers.

"Lookalike matching" can be performed even if there are no direct matches at all, since fundamentally the demographic profile of the product purchasers is used to identify lookalike cable subscribers.

Another modification may be to use target definitions for advertising industries, rather than specific advertisers. There are tens of thousands of television advertisers, and many may not have good product purchaser data. However if there are at least some advertiser's with product purchasers, then these can be used as the canonical target profiles for industries to which that advertiser belongs. For example, if one life insurance advertiser's product purchasers are known, then these persons can be used as a proxy for the life insurance industry overall. Thus, addressable audience packages can be created for industries like "Life insurance," "Investment Services" etc. The advertiser can then purchase these dynamically scored packages of cable subscribers, rather than trying to run the addressable algorithm on their own historical customers. In practice this is a useful modification that enables the invention to be able to service a wide range of advertisers—and similarly allows prices to be estimated for large groups of advertisers.

A. Reports

FIG. 11 shows a lift analysis for Algorithm A, B, and D using advertiser calculated buyer per million data. The chart shows the cumulative percentage of buyers isolated in media (or subscribers) if that media is sorted in order of highest score to lowest. In FIG. 11, an optimal algorithm would hug the left-hand axis and the diagonal line indicates random performance. That ratio of y-axis-value for algorithm to the y-axis value for random is equal to the lift over random. For example, if an advertiser had a budget to target the best scoring 1% of the population, and were using Addressable targeting, their lift would be 9.9×. If they targeted ads to 2% of subscribers, their lift would drop to 6.5×. The diagonal line shows the performance of a theoretical campaign in which assets are bought randomly.

In the case of this particular advertiser, this analysis shows that TRPs (Algorithm A) are somewhat unreliable and have almost random performance in the first 15% of targetable assets (1.07× for 15%). In contrast, M32 (Algorithm B) shows more consistent performance (1.32× in 15%). Addressable Algorithm D achieves 2.42× lift in the top 15%.

The quality of targeting across the full range of targetable assets can be summarized by a metric known as Area Under the Curve (AUC), where increased lift is reflected in a larger AUC. The AUC for Addressable Algorithm D, M32 and TRPs are 0.668, 0.579 and 0.529, respectively (see Table 2).

The strength of the relationship between targeting score and buyers per impression is summarized by the $R^2$ Statistic. A greater $R^2$ score indicates a stronger relationship. Addressable Algorithm D has an $R^2$ of 0.499 compared to 0.532 for M32 and 0.242 for TRP (Table 2).

FIG. 12 depicts addressable algorithm D performance as buyers per impression versus tratio. In FIG. 12 the x-axis is tratio divided into 100 percentile buckets and y-axis is buyers per impression. Each circle represents the number of buyers in each bucket. The flat region from tratio −0.3 to −0.05 is a common feature in television targeting curves—this shows that a lot of TV impressions are essentially "wasted" if they are not interested in the product.

FIG. 13 depicts addressable algorithm D lift versus % of assets targeted, reported in percentiles. Although addressable algorithm D targeting lift is high, the key question is how much higher is this lift compared to what could be achieved by buying audiences in conventional TV programs and conventional media prices. FIG. 14 attempts to answer this question by showing the ratio between lift from addressable algorithm D over M32 (Algorithm B) and TRPs (Algorithm A).

FIG. 14 shows the premium CPM that could be charged for an advertiser by the % of subscribers that they are targeting. For example, if they are targeting 10% of subscribers, the publisher could charge 2 times their standard national CPM price under addressable algorithm D. Based on this analysis—for this example advertiser—it may be concluded that:

1. Peak lift for addressable algorithm D, M32 and TRP are approximately 9.9×, 1.75× and 1.21×, respectively.

2. Target size strongly correlates to lift: Lift from addressable algorithm D may decrease exponentially with target size. At 10% of population, addressable algorithm D may not be substantially higher performing than conventional TV media. If more than 32% of households must receive an ad, then addressable targeting may perform worse than the best conventional media targeting option (ie. because a lot of poor matching subscribers are being required to be purchased, it is actually possible to get a more "pure" audience by buying conventional television commercial break spots on certain programs).

Table 3 shows the comparison of lift between each algorithm. Addr/TRP is the ratio of lift between Algorithm D and Algorithm A. This shows that addressable algorithm D would deliver about 7 times better performance per viewer reached (for the top 1% of addressable cable subscribers), than very selectively buying the top 1% of conventional television spot media. Thus the price for the addressable inventory—for a 1% cable subscriber purchase—could be set to about 7 times higher than that of the conventional media.

TABLE 1A

Performance for three different TV targeting algorithms

| Measure | TRP | M32 | Addr |
|---|---|---|---|
| AUC | 0.529 | 0.579 | 0.668 |
| $R^2$ | 0.242 | 0.532 | 0.499 |
| Lift top 1% | 1.266 | 1.749 | 9.912 |
| Lift top 10% | 0.957 | 1.403 | 3.177 |
| Lift top 20% | 1.111 | 1.317 | 2.195 |

TABLE 2

Lift versus % of Assets targeted

| Pctl | TRP lift | M32 lift | M32/TRP | Addr Lift | Addr/TRP | Addr/M32 | Addr/Max M32 |
|---|---|---|---|---|---|---|---|
| 0% | 1.27 | 1.75 | 38% | 9.91 | 7.83 | 5.67 | 5.26 |
| 1% | 1.53 | 1.88 | 23% | 6.54 | 4.26 | 3.47 | 3.47 |
| 2% | 1.37 | 1.50 | 10% | 5.41 | 3.95 | 3.60 | 2.87 |
| 3% | 1.16 | 1.36 | 17% | 4.49 | 3.87 | 3.31 | 2.38 |
| 4% | 1.10 | 1.32 | 20% | 4.13 | 3.75 | 3.12 | 2.19 |
| 5% | 1.07 | 1.30 | 21% | 3.73 | 3.48 | 2.88 | 1.98 |
| 6% | 1.04 | 1.29 | 24% | 3.59 | 3.47 | 2.79 | 1.91 |
| 7% | 1.00 | 1.31 | 32% | 3.40 | 3.40 | 2.59 | 1.81 |
| 8% | 0.98 | 1.39 | 42% | 3.32 | 3.40 | 2.40 | 1.76 |
| 9% | 0.96 | 1.40 | 47% | 3.18 | 3.32 | 2.26 | 1.69 |
| 10% | 0.97 | 1.41 | 45% | 3.01 | 3.09 | 2.13 | 1.60 |
| 11% | 0.97 | 1.40 | 45% | 2.83 | 2.93 | 2.01 | 1.50 |
| 12% | 1.00 | 1.39 | 39% | 2.70 | 2.69 | 1.94 | 1.43 |
| 13% | 1.03 | 1.37 | 34% | 2.62 | 2.55 | 1.91 | 1.39 |
| 14% | 1.07 | 1.37 | 27% | 2.51 | 2.34 | 1.84 | 1.33 |
| 15% | 1.07 | 1.36 | 27% | 2.42 | 2.26 | 1.77 | 1.28 |
| 16% | 1.07 | 1.36 | 27% | 2.34 | 2.19 | 1.72 | 1.24 |
| 17% | 1.08 | 1.35 | 26% | 2.29 | 2.13 | 1.69 | 1.22 |
| 18% | 1.10 | 1.34 | 22% | 2.25 | 2.05 | 1.68 | 1.19 |
| 19% | 1.11 | 1.32 | 19% | 2.19 | 1.97 | 1.67 | 1.16 |
| 20% | 1.11 | 1.30 | 17% | 2.15 | 1.93 | 1.65 | 1.14 |
| 21% | 1.12 | 1.29 | 15% | 2.10 | 1.87 | 1.62 | 1.11 |
| 22% | 1.12 | 1.30 | 17% | 2.06 | 1.85 | 1.58 | 1.10 |
| 23% | 1.12 | 1.31 | 17% | 2.04 | 1.83 | 1.56 | 1.08 |
| 24% | 1.12 | 1.30 | 16% | 2.03 | 1.82 | 1.56 | 1.08 |
| 25% | 1.11 | 1.30 | 16% | 2.01 | 1.81 | 1.55 | 1.07 |
| 26% | 1.11 | 1.30 | 17% | 2.00 | 1.80 | 1.54 | 1.06 |
| 27% | 1.11 | 1.30 | 16% | 1.99 | 1.79 | 1.54 | 1.06 |
| 28% | 1.12 | 1.30 | 16% | 1.98 | 1.77 | 1.52 | 1.05 |
| 29% | 1.12 | 1.30 | 17% | 1.96 | 1.75 | 1.50 | 1.04 |
| 30% | 1.11 | 1.32 | 18% | 1.94 | 1.74 | 1.47 | 1.03 |
| 31% | 1.12 | 1.33 | 19% | 1.92 | 1.72 | 1.44 | 1.02 |
| 32% | 1.13 | 1.35 | 20% | 1.91 | 1.69 | 1.41 | 1.01 |
| 33% | 1.14 | 1.37 | 20% | 1.87 | 1.65 | 1.37 | 0.99 |

TABLE 2-continued

Lift versus % of Assets targeted

| Pctl | TRP lift | M32 lift | M32/ TRP | Addr Lift | Addr/ TRP | Addr/ M32 | Addr/ Max M32 |
|---|---|---|---|---|---|---|---|
| 34% | 1.13 | 1.37 | 21% | 1.85 | 1.64 | 1.35 | 0.98 |
| 35% | 1.13 | 1.38 | 22% | 1.83 | 1.61 | 1.32 | 0.97 |

TABLE 3

Media prices compared to National.

| TV Geographic Level | CPM | TV Households | Price Divided by National price |
|---|---|---|---|
| National cable | 6.6 | 114,000,000 | 1.0 |
| Local Cable Interconnect | 20 | 500,000 | 3.0 |
| Zone | 40 | 50,000 | 6.1 |
| Addressable | 120 | 1 | 18.2 |

VIII. "Context Addressable" Ad Insertions ("Targeting Algorithm E")

Addressable television targeting (Algorithms C,D) and conventional television spot buying (TRP and/or M32) may be combined to create a higher lift and a better television commercial experience. Traditional set top boxes generally cannot tell which particular individual of a household is watching TV at any given time. Therefore, knowing that a young adult female is in a household is useful, but inserting the ad to the household with the female occupant, plus into, e.g., Pod A for, e.g., Vampire Diaries, may be a more effective strategy for getting the ad in front of the intended target in the household, than an addressable targeting alone.

In order to combine addressable targeting and buyer targeting a media inventory may be defined to be a combination of household and conventional media: $Mi'=M_i \times M_{i,addr}$. Both algorithms Addr and M32 may be weighted in targeting the above media. An additional level of contextual advertising could be to weight the match between keywords of the program and of the advertiser's product.

A. Addressable Market Design and Packaging

When a cable operator sells x % addressable inventory to the advertiser they are left with (1−x %) inventory that is now left unsold. They need to look for ways to back-fill—either by providing it as a kind of local break to other advertisers, or by inserting Public Service Announcements (PSAs). Creative targeting where different creative are delivered to different households, is another application that can make use of addressable targeting infrastructure, and gets around the target size problem. However the lift possible with this approach is not likely to be as high as refining the target.

For example, if networks were to sell 1% of targeted households, the increased value of the inventory mean that the publisher could charge CPMs up to 5× a conventional media asset price. However, this then leaves the publisher with 99% of their unsold, and for which they need to find another buyer lest they incur a 95% loss.

In order avoid this problem, some publishers have created minimums on addressable households x % and price charged per thousand subscribers (CPM). Unfortunately, these minimums may to make it impossible for advertisers to achieve their needed economics. Current addressable targeting pilot implementations have a requirement of 20% minimum number of targeted households, at $120 CPM. At 20% of households, and using our calculated lifts (previous section) addressable inventory is only 14% higher performing than standard network-program-dayparts. However the CPM being charged for addressable inventory is 18.2 times higher than standard national media prices (Table 4).

Thus Addressable media is currently about 18 times lower performing per dollar compared to a conventional media buy.

In order to solve this problem, publishers could set up an exchange so that as addressable cable subscriber ad inventory is sold, the remainder may be easily purchased by other advertisers. The key difference with this market mechanism is that batches of people would be sold by cable operators. A market design following these principles is illustrated in FIG. 15.

For any advertiser's target, or a common industry target (such as life insurance), a "package" of viewers may be defined by ranking scored cable subscribers in order of match score using addressable algorithm C or D (1510). Then, the viewers may be broken into N packages, for example, N=100 means there would be a buyable package of viewers who represent the top 1% of viewers, the top 2%, and so on (1520).

FIG. 16 depicts buyable assets as a GUI according to exemplary embodiments of the present disclosure to allow advertisers to target their assets.

FIG. 16 depicts a zoom out in an audience planner GUI according to exemplary embodiments of the present disclosure showing the different assets that could be purchased, bucketed by tratio. In FIG. 16, the x-axis is the tratio. In FIG. 16, each square in the column of squares may represent a buyable asset. The higher tratio assets may be websites or digital segments—it may be possible to get a more "pure" target audience with these assets, although they may also be much smaller than TV programs. TV programs may occupy many of the lower tratio buckets.

As shown in FIG. 16, buyable assets may be histogrammed by degree of targeting. A mix of TV programs, web sites, and VOD (1610) may be broadly targeted while VOD, web site and digital segments (1620, 1630 and 1640) may be very highly targeted.

FIG. 17 depicts a zoom in detail of an audience planner GUI, such as the GUI depicted in FIG. 16. Zoom in may make it easier to see the different icons being used to represent each asset. For example, the "WWW" icon may represent a website, and the "People" icon may represent a digital segment. "Insp" may represent the "Inspiration network"—a television network that runs religious programming. Addressable audiences may be represented by a "Play button" icon, as well as familiar TV programs As shown in FIG. 17, each buyable asset may include, for example, TV programs (1710), web sites (1720), digital segments (1730), and VOD (1740), etc.

FIG. 18 shows a set of buyable media including TV program 1810, digital segment 1830, website 1820, and so on. "Insertable VOD (Insertable Video On Demand) 16% of Pop" (1840) is a viewer package that can be purchased that will capture the top 16% of population who are most likely to convert on the advertiser's product.

If the advertiser or sell-side entity has access to the match between buyers and set top box viewers, they may also calculate expected lift estimates using the methods discussed above for selected packages of ranked cable subscribers (1530-1540) by measuring the concentration of buyers in the population being purchased. This may help to measure the value of the viewership package, and so may help the advertiser to determine what price to offer. The sell-side entity may then sell the selected packages to the advertiser (1550).

The sell-side entity may then repeat the process (1560) by re-ranking the remaining viewers who have not been sold using their scores for Addressable Algorithm C or D, and re-forming dynamic packages for advertisers. There may be thousands of advertisers, and they may each have a view into their own unique, dynamic packages that they can purchase. In this way the sell-side entity may encourage participation by multiple advertisers.

The above auction may be modified in many ways. For example, another advertiser may be allowed to out-bid an earlier advertiser for viewers who were already auctioned. Novel parts of this embodiment may include, for example, (a) defining packages of buyable media as groups of viewers based on a ranking of their targeting for a particular advertiser—or advertiser industry, and (b) auctioning these assets, etc.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of targeting of advertising content for a consumer product, the method comprising:
    enriching product purchaser data for a plurality of product purchaser devices associated with purchase of the consumer product with consumer demographic data including a plurality of demographic attributes;
    calculating, by a hardware processor, a vector of probabilities that a product purchaser device among the plurality of product purchaser devices will have a demographic attribute among the plurality of demographic attributes,
    enriching electronic content subscriber data for a plurality of electronic content subscriber devices with the consumer demographic data, each electronic content subscriber device being among the plurality of product purchaser devices,
    calculating, by the hardware processor, a vector of demographic attributes for each electronic content subscriber device among the plurality of electronic content subscriber devices;
    calculating by the hardware processor a first similarity between the product purchaser data and each electronic content subscriber device among the plurality of electronic content subscriber devices by calculating a vector match between the vector of probabilities and the vector of demographic attributes for each electronic content subscriber device among the plurality of electronic content subscriber devices; and
    selecting electronic content subscriber devices among the plurality of electronic content subscriber devices based on the first similarity to the product purchasers as target electronic content subscriber devices for the advertising content.

2. The method of claim 1, wherein the vector match is calculated based on a correlation between the demographic attributes of the electronic content subscriber devices and the calculated vector of probabilities.

3. The method of claim 1, further comprising:
    obtaining from a set top box set top box data including viewing behavior data of a plurality of viewing persons;
    selecting, as purchaser-viewers, product purchasers among the plurality of product purchasers matching viewing persons among the plurality of viewing persons;
    selecting electronic content subscriber devices among the plurality of electronic content subscriber devices matching viewing persons among the plurality of viewing persons,
    wherein the calculating the first similarity is based on viewing behavior data of the purchaser-viewers and viewing behavior data of the selected electronic content subscriber devices.

4. The method of claim 1, further comprising:
    obtaining, over the network, viewing data of a plurality of viewing persons, the viewing data including a plurality of viewed media viewed by a respective viewing person among the plurality of viewing persons and the viewed media including attributes of the respective viewing person;
    calculating by the hardware processor a second similarity between one or more product purchasers and each viewed media, the one or more product purchasers and each viewed media having at least one attribute in common;
    selecting viewed media among the viewed media based on the second similarity to the product purchasers as purchaser media;
    selecting purchaser media as target media for the advertising content when it is determined that the purchaser media is viewed by one or more target electronic content subscriber devices.

5. A system for targeting of advertising content for a consumer product, the system comprising:
    a server providing consumer demographic data from over the network;
    an advertising targeting controller configured to:
        enrich product purchaser data for a plurality of product purchaser devices associated with purchase of the consumer product with the consumer demographic data including a plurality of demographic attributes;
        calculate, by a hardware processor, a vector of probabilities that a product purchaser device among the plurality of product purchaser devices will have a demographic attribute among the plurality of demographic attributes,
        enrich electronic content subscriber data for a plurality of electronic content subscriber devices with the consumer demographic data, each electronic content subscriber device being among the plurality of product purchaser devices,
        calculate, by the hardware processor, a vector of demographic attributes for each electronic content subscriber device among the plurality of electronic content subscriber devices;
        calculate by the hardware processor a first similarity between the product purchaser data and each electronic content subscriber device among the plurality of electronic content subscriber devices by calculating a vector match between the vector of probabilities and the vector of demographic attributes for each electronic content subscriber device among the plurality of electronic content subscriber devices; and
        select electronic content subscriber devices among the plurality of electronic content subscriber devices based on the first similarity to the product purchasers as target electronic content subscriber devices for the advertising content.

6. The system of claim 5, wherein the vector match is calculated based on a correlation between the demographic attributes of the electronic content subscriber devices and the calculated vector of probabilities.

7. The system of claim 5, further comprising:
a set top box set providing top box data including viewing behavior data of a plurality of viewing persons,
wherein the advertising targeting controller is further configured to:
obtain the set top box data;
select, as purchaser-viewers, product purchasers among the plurality of product purchasers matching viewing persons among the plurality of viewing persons; and
select electronic content subscriber devices among the plurality of electronic content subscriber devices matching viewing persons among the plurality of viewing persons, and
wherein the calculating the first similarity is based on viewing behavior data of the purchaser-viewers and viewing behavior data of the selected electronic content subscriber devices.

8. The system of claim 5, further comprising:
a second server providing, over the network, viewing data of a plurality of viewing persons, the viewing data including a plurality of viewed media viewed by a respective viewing person among the plurality of viewing persons and the viewed media including attributes of the respective viewing person;
wherein the advertising targeting controller is further configured to:
obtain the viewing data;
calculate by the hardware processor a second similarity between one or more product purchasers and each viewed media, the one or more product purchasers and each viewed media having at least one attribute in common;
select viewed media among the viewed media based on the second similarity to the product purchasers as purchaser media; and
select purchaser media as target media for the advertising content when it is determined that the purchaser media is viewed by one or more target electronic content subscriber devices.

9. A non-transitory computer readable medium storing a program causing a computer to execute a method of targeting of advertising content for a consumer product, the method comprising:
enriching product purchaser data for a plurality of product purchaser devices associated with purchase of the consumer product with consumer demographic data including a plurality of demographic attributes;
enriching the electronic content subscriber data for a plurality of electronic content subscriber devices with the consumer demographic data, each electronic content subscriber device being among the plurality of product purchaser devices,
calculating, by a hardware processor, a vector of probabilities that a product purchaser device among the plurality of product purchaser devices will have a demographic attribute among the plurality of demographic attributes,
calculating, by the hardware processor, a vector of demographic attributes for each electronic content subscriber device among the plurality of electronic content subscriber devices;
calculating by the hardware processor a first similarity between the product purchaser data and one or more electronic content subscriber devices among the plurality of electronic content subscriber devices by calculating a vector match between the vector of probabilities and the vector of demographic attributes for each electronic content subscriber device among the plurality of electronic content subscriber devices; and
selecting electronic content subscriber devices among the plurality of cable subscriber devices based on the first similarity to the product purchasers as target cable subscriber devices for the advertising content.

10. The non-transitory computer readable medium according to claim 9, wherein the vector match is calculated based on a correlation between the demographic attributes of the electronic content subscriber devices and the calculated vector of probabilities.

11. The non-transitory computer readable medium according to claim 9, the executed method further comprising:
obtaining from a set top box set top box data including viewing behavior data of a plurality of viewing persons;
selecting, as purchaser-viewers, product purchasers among the plurality of product purchasers matching viewing persons among the plurality of viewing persons;
selecting electronic content subscriber devices among the plurality of electronic content subscriber devices matching viewing persons among the plurality of viewing persons,
wherein the calculating the first similarity is based on viewing behavior data of the purchaser-viewers and viewing behavior data of the selected electronic content subscriber devices.

12. The non-transitory computer readable medium according to claim 9, the executed method further comprising:
obtaining, over the network, viewing data of a plurality of viewing persons, the viewing data including a plurality of viewed media viewed by a respective viewing person among the plurality of viewing persons and the viewed media including attributes of the respective viewing person;
calculating by the hardware processor a second similarity between one or more product purchasers and each viewed media, the one or more product purchasers and each viewed media having at least one attribute in common;
selecting viewed media among the viewed media based on the second similarity to the product purchasers as purchaser media;
selecting purchaser media as target media for the advertising content when it is determined that the purchaser media is viewed by one or more target electronic content subscriber devices.

* * * * *